US008924277B2

(12) United States Patent
Allen et al.

(10) Patent No.: US 8,924,277 B2
(45) Date of Patent: Dec. 30, 2014

(54) METHOD AND SYSTEM FOR AUTOMATIC EXECUTION OF A SECURITIES TRANSACTION

(75) Inventors: Anne E. Allen, Cranford, NJ (US); Paul N. Desroches, Newburgh, NY (US)

(73) Assignee: NYSE Group, Inc., New York, NY (US)

( * ) Notice: Subject to any disclaimer, the term of this patent is extended or adjusted under 35 U.S.C. 154(b) by 2869 days.

(21) Appl. No.: 09/929,886

(22) Filed: Aug. 15, 2001

(65) Prior Publication Data

US 2002/0138401 A1    Sep. 26, 2002

Related U.S. Application Data

(60) Provisional application No. 60/226,330, filed on Aug. 17, 2000.

(51) Int. Cl.
*G06Q 40/00* (2012.01)
*G06Q 40/06* (2012.01)
*G06Q 30/08* (2012.01)
*G06Q 40/04* (2012.01)

(52) U.S. Cl.
CPC ............... *G06Q 40/04* (2013.01); *G06Q 40/06* (2013.01); *G06Q 30/08* (2013.01)
USPC .............................. 705/37; 705/35; 705/36 R

(58) Field of Classification Search
USPC ..................................................... 705/36–40
See application file for complete search history.

(56) References Cited

U.S. PATENT DOCUMENTS 4,412,287 A  * 10/1983  Braddock, III ................. 705/37
4,674,044 A     6/1987  Kalmus et al.
4,903,201 A     2/1990  Wagner
5,557,517 A     9/1996  Daughterty, III
5,689,652 A    11/1997  Lupien et al.
5,809,483 A     9/1998  Broka et al.
5,873,071 A     2/1999  Ferstenberg et al.
5,915,209 A     6/1999  Lawrence
5,950,176 A     9/1999  Keiser et al.

(Continued)

FOREIGN PATENT DOCUMENTS

| EP | 0401203 A2 | 5/1990 |
| JP | 411185092 A | 7/1999 |
| WO | WO98/18418 | 6/1995 |
| WO | WO98/13778 | 4/1998 |

OTHER PUBLICATIONS

Hasbrouck, Sofianos & Sosebee, New York Stock Exchange Systems and Trading Procedures, NYSE Working Paper #93-01, Draft 1.2, Apr. 27, 1993, p. 13.*

(Continued)

*Primary Examiner* — Harish T Dass
*Assistant Examiner* — Siegfried E Chencinski
(74) *Attorney, Agent, or Firm* — Milbank, Tweed, Hadley & McCloy LLP

(57) ABSTRACT

A securities transaction, such as a buy or sell order is transmitted to a securities exchange with an indicator requesting automatic execution. In one embodiment, the securities transaction has a limit price and if the limit price is equal to or better than the current quote for the security on the exchange, the transaction is automatically executed without exposing the transaction to the auction market crowd on the exchange floor for possible price improvement. In another embodiment, the securities transaction is a market order, and if otherwise eligible, the transaction is automatically executed without exposing the transaction to auction market crowd on the exchange floor for possible price improvement.

29 Claims, 31 Drawing Sheets

(56) References Cited

U.S. PATENT DOCUMENTS

| | | | |
|---|---|---|---|
| 5,987,419 A | | 11/1999 | Hachino et al. |
| 6,014,627 A | | 1/2000 | Togher et al. |
| 6,014,643 A | | 1/2000 | Minton |
| 6,016,483 A | | 1/2000 | Rickard et al. |
| 6,098,051 A | * | 8/2000 | Lupien et al. ............... 705/36 R |
| 6,112,189 A | | 8/2000 | Rickard et al. |
| 6,173,270 B1 | * | 1/2001 | Cristofich et al. ............. 705/37 |
| 6,195,647 B1 | | 2/2001 | Martyn et al. |
| 6,278,982 B1 | | 8/2001 | Korhammer et al. |
| 6,343,278 B1 | | 1/2002 | Jain et al. |
| 6,393,409 B2 | * | 5/2002 | Young et al. .................... 705/37 |
| 6,519,574 B1 | * | 2/2003 | Wilton et al. ................... 705/35 |
| 2001/0044767 A1 | * | 11/2001 | Madoff et al. .................. 705/37 |
| 2002/0035534 A1 | | 3/2002 | Buist et al. |
| 2002/0038275 A1 | | 3/2002 | Brixius |

OTHER PUBLICATIONS

Cynthia A. Glassman, Speech by SEC Commissioner: Remarks before the open meeting regarding the IA/BD Rule. US Securities and Exchange Commission, Apr. 6, 2005, p. 1, ll. 15-16, p. 2, ll. 1-4.*

Morgan Stanley Group Inc/DE—'424B3', Jul. 29, 1996, SEC Filing, Accession No. 950103-96-1030, lines 56, 68, 81, 88, 163, 179, 190, 198, 212, 493, 505, 515, 549, 567, 598, 649, 674, 679.*

John Downes and Jordan Elliot Goodman, Dictionary of Finance and Investment Terms, 1998, Barron's Financial Guides,Fifth Ed.; pp. 119, 432, 433.*

Morgan Stanley Group Inc/DE—'42483', Jul. 29, 1996, SEC Filing, Accession No. 950103-96-1030, lines 56, 68, 81, 88, 163, 179, 190, 198, 212, 493, 505, 515, 549, 567, 598, 649, 674, 679.*

CNBC News Transcripts, "Special Committee Addresses Market Structure Issues at the New York Stock Exchange's Quarterly Meeting" Apr. 6, 2000.

New York Stock Exchange NYSE Fully Implements Automatic Order Execution Service NYSE Direct + Apr. 11, 2001.

Market Access Subcommittee Interim Report, Nov. 27, 2001.

Best Practices for Organized Electronic Markets, Apr. 24, 2002.

Office Action CA 2,419,821, Jun. 6, 2009, Allen.

A Taxonomy of Automated Trade Execution Systems, Ian Domowitz, Journal of International Money and Finance, (1993), 12, pp. 607-631.

* cited by examiner

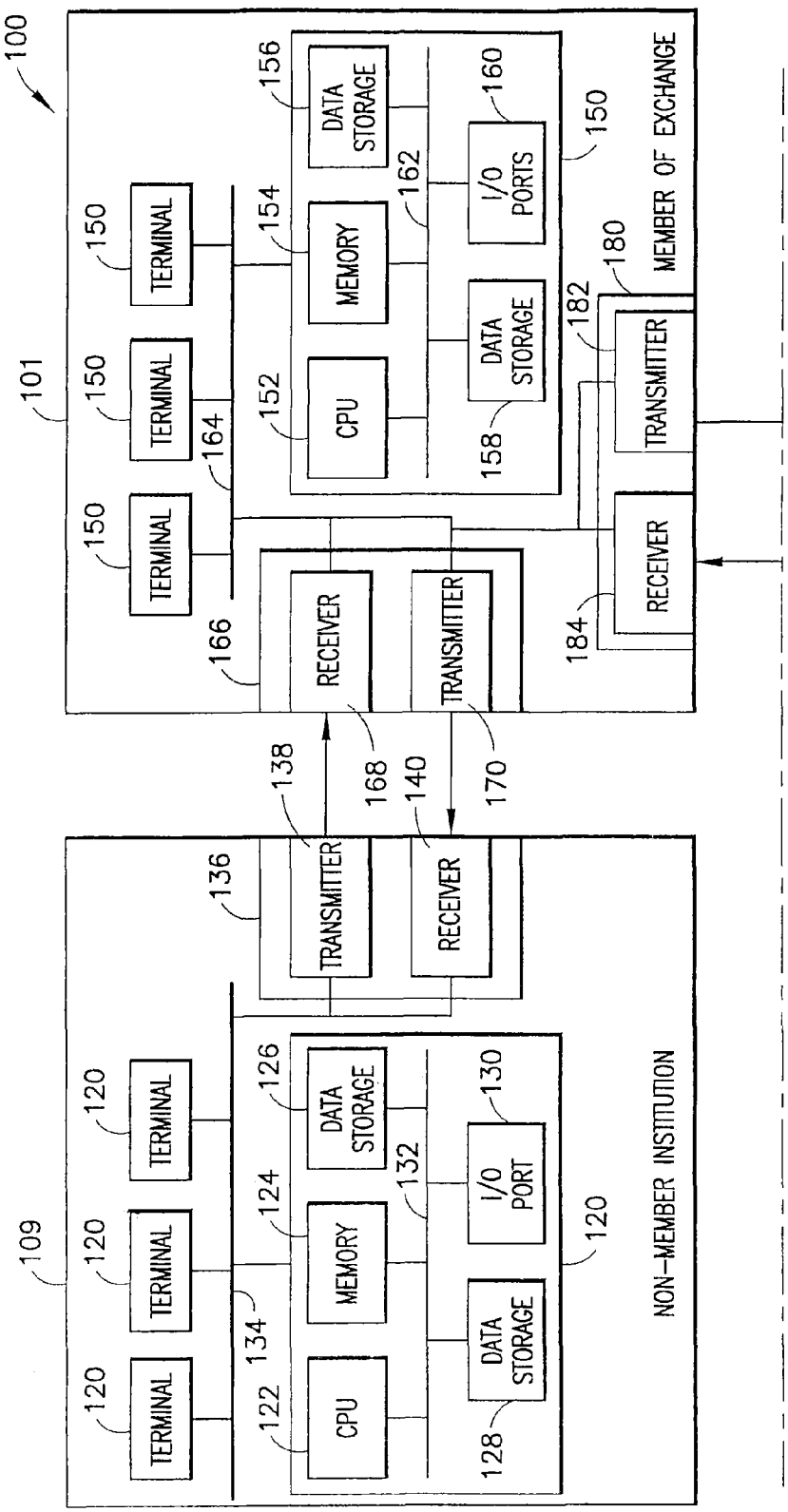

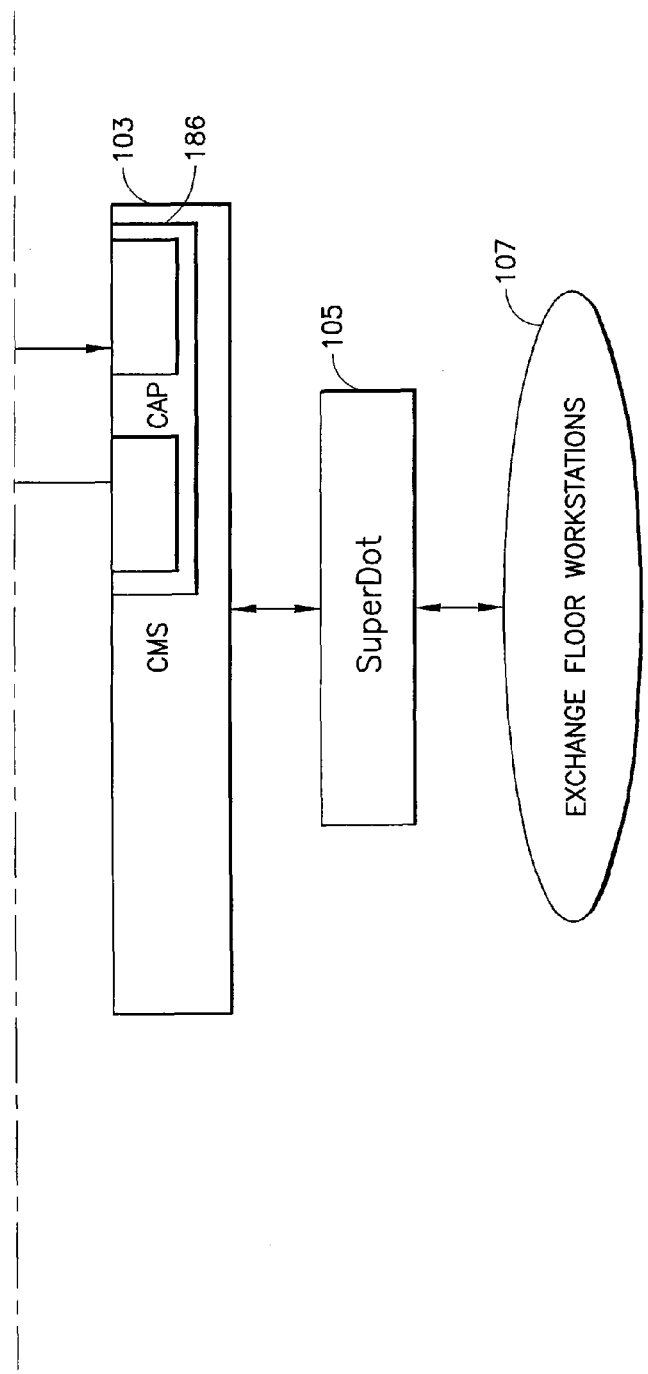

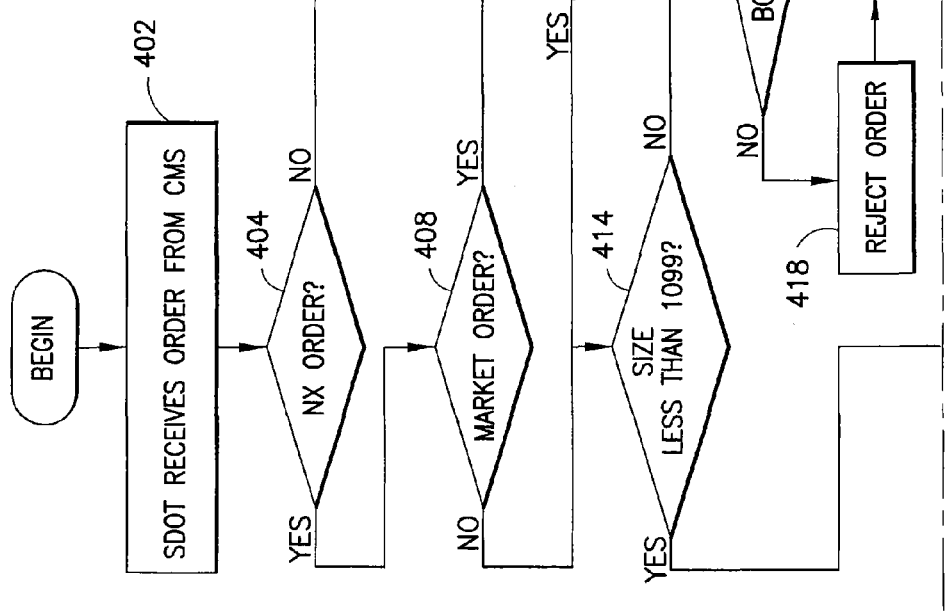

|  |  |  |  |  |
|---|---|---|---|---|
| 702 — BAG | 32.00<br>20 |  | 32.01<br>50 | −32.00 |
|  | LMT | PRICE | LMT |  |
|  |  | 32.05 | 6 |  |
|  |  | 32.04 | 5 |  |
|  |  | 32.02 | 12 |  |
|  |  | 32.01 | 50 |  |
|  | 714 — 20 | 32.00 |  |  |
|  | 50 | 31.14 |  |  |
|  | 2 | 31.11 |  |  |
| 706 / 708 | 25 | 31.08 |  |  |
| 2,6 | 8 | MKT |  |  |
|  |  | STOP |  |  |

|  |  |  |  |  |
|---|---|---|---|---|
| BAG | 32.00<br>10 |  | 32.01<br>50 | −32.00 |
|  | LMT | PRICE | LMT |  |
|  |  | 32.05 | 6 |  |
|  |  | 32.04 | 5 |  |
|  |  | 32.02 | 12 |  |
|  |  | 32.01 | 50 |  |
|  | 716 — 12 | 32.00 |  |  |
|  | 50 | 31.14 |  |  |
|  | 2 | 31.11 |  |  |
|  | 25 | 31.08 |  |  |
| 6 | 6 | MKT |  |  |
|  |  | STOP |  |  |

| BAG | 32.00 200 | | 32.01 50 | | -32.00 |
|---|---|---|---|---|---|
| | LMT | PRICE | LMT | | |
| | | 32.05 | 15 | | |
| | | 32.04 | 5 | | |
| | | 32.02 | 12 | | |
| | | 32.01 | 50 | | |
| | 50 | 31.14 | | | |
| | 2 | 31.11 | | | |
| | 95 | 31.09 | | | |
| | 25 | 31.08 | | | |
| | | MKT | | | |
| | | STOP | | | |

806

| BAG | 32.00 190 | | 32.01 50 | | -32.00 |
|---|---|---|---|---|---|
| | LMT | PRICE | LMT | | |
| | | 32.05 | 15 | | |
| | | 32.04 | 5 | | |
| | | 32.02 | 12 | | |
| | | 32.01 | 50 | | |
| | 50 | 31.14 | | | |
| | 2 | 31.11 | | | |
| | 95 | 32.09 | | | |
| | 25 | 31.08 | | | |
| | | MKT | | | |
| | | STOP | | | |

| BAG | 32.00 221 | | 32.01 50 | −32.00 |
|---|---|---|---|---|
| | LMT | PRICE | LMT | |
| | | 32.05 | 6 | |
| | | 32.04 | 5 | |
| | | 32.02 | 12 | |
| | | 32.01 | 50 | |
| | 40 | 32.00 | | |
| | 50 | 31.14 | | |
| | 2 | 31.11 | | |
| | 95 | 31.09 | | |
| | | MKT | | |
| | | STOP | | |

| BAG | 32.00 213 | | 32.01 50 | −32.00 |
|---|---|---|---|---|
| | LMT | PRICE | LMT | |
| | | 32.05 | 6 | |
| | | 32.04 | 5 | |
| | | 32.02 | 12 | |
| | | 32.01 | 50 | |
| 910 — | 38 | 32.00 | | |
| | 50 | 31.14 | | |
| | 2 | 31.11 | | |
| | 25 | 31.09 | | |
| | | MKT | | |
| | | STOP | | |

| BAG | | | QUOTE ENTRY |
|---|---|---|---|
| PARITY DIVISOR | 31.14 | 32.01 | PARITY DIVISOR |
| | 2 | 50 | |
| 1 | | | 1 |

FIG.10A

| BAG | 31.14 | | 32.01 | | −31.14 |
|---|---|---|---|---|---|
| | 2 | | 50 | | |
| | LMT | PRICE | LMT | | |
| | | 32.05 | 6 | | |
| | | 32.04 | 5 | | |
| | | 32.02 | 12 | | |
| | | 32.01 | 50 | | |
| | 2 | 31.14 | | | |
| | 2 | 31.11 | | | |
| | 95 | 31.09 | | | |
| | 12 | 31.08 | | | |
| | | MKT | | | |
| | | STOP | | | |

FIG.10B

| BAG | 31.14 | | 32.01 | | −31.14 |
|---|---|---|---|---|---|
| | 1 | | 50 | | |
| | LMT | PRICE | LMT | | |
| | | 32.04 | 5 | | |
| | | 32.02 | 12 | | |
| | | 32.01 | 50 | | |
| | | 31.14 | 8 | — 1004 | |
| 1002 — | 2 | 31.11 | | | |
| | 95 | 31.09 | | | |
| | 12 | 31.08 | | | |
| | 11 | 31.07 | | | |
| | | MKT | | | |
| | | STOP | | | |

FIG.10C

| BAG | | | QUOTE ENTRY |
|---|---|---|---|
| PARITY DIVISOR | 31.11 | 31.14 | PARITY DIVISOR |
| | 10 | 8 | |
| 1 | | | 1 |

FIG.11A

| BAG | 31.11 | | 31.14 | | −31.11 |
|---|---|---|---|---|---|
| | 10 | | 8 | | |
| | LMT | PRICE | LMT | | |
| | | 32.04 | 5 | | |
| | | 32.02 | 12 | | |
| | | 32.01 | 50 | | |
| | | 31.14 | 8 | | |
| | 2 | 31.11 | | | |
| | 95 | 31.09 | | | |
| | 50 | 31.08 | | | |
| | 25 | 31.07 | | | |
| | | MKT | | | |
| | | STOP | | | |

FIG.11B

| BAG | 31.11 | | 31.14 | | −31.11 |
|---|---|---|---|---|---|
| | 10 | | 8 | | |
| | LMT | PRICE | LMT | | |
| | | 32.04 | 5 | | |
| | | 32.02 | 12 | | |
| | | 32.01 | 50 | | |
| 1102— | 5 | 31.14 | 8 | | |
| 1106— | 5 | 31.13 | | | |
| 1104— | 5 | 31.12 | | | |
| 1108— | 2 | 31.11 | | | |
| | 95 | 31.09 | | | |
| | | MKT | | | |
| | | STOP | | | |

FIG.11C

| BAG | 1110<br>31.11<br>1 | | 31.14<br>8 | −31.11 |
|---|---|---|---|---|
| | LMT | PRICE | LMT | |
| | | 32.04 | 5 | |
| | | 32.02 | 12 | |
| | | 32.01 | 50 | |
| 1102 — | | 31.14 | 8 | |
| 1106 — 5 | | 31.13 | | |
| 1104 — 2 | | 31.12 | | |
| | 95 | 31.09 | | |
| | 50 | 31.08 | | |
| | | MKT | | |
| | | STOP | | |

FIG. 11D

| BAG | 31.00 | | 31.03 | | −31.02 |
|---|---|---|---|---|---|
| | 4 | | 50 | | |
| | LMT | PRICE | LMT | | |
| | | 31.10 | 90 | | |
| | | 31.08 | 70 | | |
| | | 31.05 | 10 | | |
| | | 31.03 | 50# | ← 1202 | |
| | 4 | 31.00 | | | |
| | 90 | 30.14 | | | |
| | 50 | 30.12 | | 1204 | |
| | 25 | 30.11 | | | |
| | | MKT | | | 50# |
| | | STOP | | | |

FIG.12A

| BAG | 1210 ↘ 31.00 | | 31.03 | 1208 ↘ | −31.00 |
|---|---|---|---|---|---|
| | 1 | | 50 | | |
| | LMT | PRICE | LMT | | |
| | | 31.10 | 90 | | |
| | | 31.08 | 70 | | |
| | | 31.05 | 10 | | |
| | | 31.01 | 50# | — 1202 | |
| | | 31.00 | 1 | — 1206 | |
| | 90 | 30.14 | | | |
| | 50 | 30.12 | | | |
| | 25 | 30.11 | | | |
| | | MKT | | | 50# |
| | | STOP | | | |

FIG.12B

| BAG | 31.00 25 | | 31.03 50 | | −31.02 |
|---|---|---|---|---|---|
| | LMT | PRICE | LMT | | |
| | | 31.10 | 90 | | |
| | | 31.08 | 70 | | |
| | | 31.05 | 10 | | |
| | | 31.03 | 50# ─ 1312 | | |
| | 25 | 31.00 | | | |
| | 90 | 30.14 | | | |
| | 50 | 30.12 | | | |
| | 25 | 30.11 | | | |
| | | MKT | | | |
| | 2:100 | STOP | 1:50 | | 50# |

| BAG | 31.00 15 | | 31.03 50 | S:10 B:20 | −31.00 |
|---|---|---|---|---|---|
| | LMT | PRICE | LMT | | |
| | | 31.10 | 90 | | |
| | | 31.08 | 70 | | |
| | | 31.05 | 10 | | |
| | | 31.01 | 50# ─ 1312 | | |
| 1308 ─ | 15 | 31.00 | | | |
| | 90 | 30.14 | | | |
| | 50 | 30.12 | | | |
| | 25 | 30.11 | | | |
| | | MKT | | | |
| | 2:100 | STOP | 1:50 | | 50# |

| BAG | 31.00 25 | | 31.03 50 | | −31.02 |
|---|---|---|---|---|---|
| | LMT | PRICE | LMT | | |
| | | 31.10 | 90 | | |
| | | 31.08 | 70 | | |
| | | 31.05 | 10 | | |
| | | 31.03 | 50# | | |
| | 25 | 31.00 | | | |
| | 90 | 30.14 | | | |
| | 50 | 30.12 | | | |
| | 25 | 30.11 | | | |
| | | MKT | | | |
| | 2:100 | STOP | 1:50 | | 50# |

| BAG | 31.00 15 | | 31.03 50 | S:10 B:20 | −31.00 |
|---|---|---|---|---|---|
| | LMT | PRICE | LMT | | |
| | | 31.10 | 90 | | |
| | | 31.08 | 70 | | |
| | | 31.05 | 10 | | |
| | | 31.03 | 50# ← 1408 | | |
| | 25 | 31.00 | | | |
| | 90 | 30.14 | | | |
| | 50 | 30.12 | | | |
| | 25 | 30.11 | | | |
| | | MKT | | | |
| | 2:100 | STOP | 1:50 | | 50# |

1406 points to the S:10 B:20 cell.

FIG. 14B

| BAG | 31.00 15 | | 31.03 50 | S:10 B:20 | −31.00 |
|---|---|---|---|---|---|
| | LMT | PRICE | LMT | | |
| | | 31.10 | 90 | | |
| | | 31.08 | 70 | | |
| | | 31.05 | 10 | | |
| | | 31.01 | 50# | ─ 1408 | |
| | 25 | 31.00 | | | |
| | 90 | 30.14 | | | |
| | 50 | 30.12 | | | |
| | 25 | 30.11 | | | |
| | | MKT | | | |
| | 2:100 | STOP | 1:50 | | 50# |

FIG.14C

| BAG | |
|---|---|
| NX SOLD  10  AT 31.00 | |
| BUYERS 10 BOOK | |
| | |
| 0  TO BE ASSIGNED | |

FIG.14D

| BAG | 31.00 25 | | 31.03 50 | | −31.02 |
|---|---|---|---|---|---|
| | LMT | PRICE | LMT | | |
| | | 31.10 | 90 | | |
| | | 31.08 | 70 | | |
| | | 31.05 | 10 | | |
| | | 31.03 | 50# | | |
| | 25 | 31.00 | | | |
| | 90 | 30.14 | | | |
| | 50 | 30.12 | | | |
| | 25 | 30.11 | | | |
| | | MKT | | | |
| | | STOP | | | 30# ⟵ 1502 |

FIG.15A

| BAG | 31.00 ⟵1506 15 | | 31.03 50 | | −31.00 ⟵1504 |
|---|---|---|---|---|---|
| | LMT | PRICE | LMT | | |
| | | 31.08 | 70 | | |
| | | 31.05 | 10 | | |
| | | 31.03 | 20 | | |
| | | 31.01 | 30# ⟵1510 | | |
| | 1508⟶ 15 | 31.00 | | | |
| | 90 | 30.14 | | | |
| | 50 | 30.12 | | | |
| | 25 | 30.11 | | | |
| | | MKT | | | |
| | | STOP | | | 30# |

FIG.15B

| BAG | 31.00 15 | | 31.03 40 | +31.03 |
|---|---|---|---|---|
| | LMT | PRICE | LMT | |
| | | 31.10 | 90 | |
| | | 31.08 | 70 | |
| | | 31.05 | 10 | |
| | | 31.03 | 50# — 1510 | |
| | 15 | 31.00 | | |
| | 90 | 30.14 | | |
| | 50 | 30.12 | | |
| | 25 | 30.11 | | |
| | | MKT | | |
| | | STOP | | 25# |

| BAG | 31.00 15 | | 31.03 40 | +31.03 |
|---|---|---|---|---|
| | LMT | PRICE | LMT | |
| | | 31.10 | 90 | |
| | | 31.08 | 70 | |
| | | 31.05 | 10 | |
| | | 31.03 | 40# | |
| | 15 | 31.00 | | |
| | 90 | 30.14 | | |
| | 50 | 30.12 | | |
| | 25 | 30.11 | | |
| | | MKT | | |
| | | STOP | | 25# |

FIG.15D

| BAG | 31.00 25 | | 31.03 50 | | −31.02 |
|---|---|---|---|---|---|
| | LMT | PRICE | LMT | | |
| | | 31.10 | 90 | | |
| | | 31.08 | 70 | | |
| | | 31.05 | 10 | | |
| | | 31.03 | 50 | 20 — 1602 | |
| | 25 | 31.00 | | | |
| | 90 | 30.14 | | | |
| | 50 | 30.12 | | | |
| | 25 | 30.11 | | | |
| | | MKT | | | |
| | | STOP | | | |

FIG.16A

| BAG | 31.00 15 | | 31.03 50 | | −31.00 |
|---|---|---|---|---|---|
| | LMT | PRICE | LMT | | |
| | | 31.10 | 90 | | |
| | | 31.08 | 70 | | |
| | | 31.05 | 10 | | |
| | | 31.03 | 50 | | |
| | 25 | 31.00 | | 20 | |
| | 90 | 30.14 | | | |
| | 50 | 30.12 | | | |
| | 25 | 30.11 | | | |
| | | MKT | | | |
| | | STOP | | | |

FIG.16B

```
BAG
NX SOLD      10    AT 31.00
             BUYERS
      10 BOOK

0  TO BE ASSIGNED
```

FIG.16C

| BAG | 31.00 15 | | 31.03 50 | | −31.00 |
|---|---|---|---|---|---|
| | LMT | PRICE | LMT | | |
| | | 31.10 | 90 | | |
| | | 31.08 | 70 | | |
| | | 31.05 | 10 | | |
| | | 31.03 | 50 | | |
| | 15 | 31.00 | | | |
| | 90 | 30.14 | | | |
| | 50 | 30.12 | | | |
| | 25 | 30.11 | | | |
| | | MKT | 30 | 20x, 3, 7 | |
| | | STOP | | | |

| BAG | 31.00 5 | | 31.03 50 | −31.02 |
|---|---|---|---|---|
| | LMT | PRICE | LMT | |
| | | 31.10 | 90 | |
| | | 31.08 | 70 | |
| | | 31.05 | 10 | |
| | | 31.03 | 50 | |
| | 5 | 31.00 | | |
| | 90 | 30.14 | | |
| | 50 | 30.12 | | |
| | 25 | 30.11 | | |
| | | MKT | | |
| | | STOP | | |

FIG.17A

| BAG | 31.00 1 | | 31.03 50 | −31.00 |
|---|---|---|---|---|
| | LMT | PRICE | LMT | |
| | | 31.10 | 90 | |
| | | 31.08 | 70 | |
| | | 31.05 | 10 | |
| | | 31.03 | 50 | |
| 1702 → | 5 | 31.00 | | |
| | 90 | 30.14 | | |
| | 50 | 30.12 | | |
| | 25 | 30.11 | | |
| | | MKT | | |
| | | STOP | | |

FIG.17B

| BAG | 30.14 90 | | 31.00 14 | | −31.00 |
|---|---|---|---|---|---|
| | LMT | PRICE | LMT | | |
| | | 31.10 | 90 | | |
| | | 31.08 | 70 | | |
| | | 31.05 | 10 | | |
| | | 31.03 | 50 | | |
| | | 31.00 | 14 | | |
| | 90 | 30.14 | | | |
| | 50 | 30.12 | | | |
| | 25 | 30.11 | | | |
| | | MKT | | | |
| | | STOP | | | |

FIG.17C

| BAG | 21.00 5 | | 21.03 50 | | -31.02 |
|---|---|---|---|---|---|
| | LMT | PRICE | LMT | | |
| | | 31.10 | 90 | | |
| | | 31.08 | 70 | | |
| | | 31.05 | 10 | | |
| | | 31.03 | 50 | | |
| | 5 | 31.00 | | | |
| | 90 | 30.14 | | | |
| | 50 | 30.12 | | 100 | |
| | 25 | 30.11 | | | |
| | | MKT | | | |
| | | STOP | | | |

FIG.18A

| BAG | 21.00 5 | | 21.03 50 | | -31.02 |
|---|---|---|---|---|---|
| | LMT | PRICE | LMT | | |
| | | 31.10 | 90 | | |
| | | 31.08 | 70 | | |
| | | 31.05 | 10 | | |
| | | 31.03 | 50 | | |
| | 5 | 31.00 | | | |
| | 90 | 30.14 | | | |
| | 50 | 30.12 | | 100 | |
| | 25 | 30.11 | | | |
| | | MKT | | | |
| | | STOP | | | |

FIG.18B

| BAG | 31.00 10 | | 31.03 50 | | −31.02 |
|---|---|---|---|---|---|
| | LMT | PRICE | LMT | | |
| | | 31.10 | 90 | | |
| | | 31.08 | 70 | | |
| | | 31.05 | 10 | | |
| 20 | | 31.03 | 50# | | |
| | 5 | 31.00 | | 10 | |
| | 90 | 30.14 | | | |
| | 50 | 30.12 | | | |
| | 25 | 30.11 | | | |
| | | MKT | | | |
| | | STOP | | 30# | |

FIG.19A

| BAG | 31.00 1 | | 31.03 50 | | −31.00 |
|---|---|---|---|---|---|
| | LMT | PRICE | LMT | | |
| X | | 31.10 | 90 | | |
| | | 31.08 | 70 | | |
| | | 31.05 | 10 | | |
| 20 | | 31.03 | 20 | | |
| | | 31.01 | 30# ←1902 | | |
| | 90 | 30.14 | | | |
| | 50 | 30.12 | | | |
| | 25 | 30.11 | ⟋1903 | | |
| | | MKT | 10X | | |
| | | STOP | | 30# | |

FIG.19B

```
BAG
NX SOLD        5      AT  31.00
              BUYERS
        0  BOOK
        5  M          1234

0  TO BE ASSIGNED
```

FIG.19C

| BAG | 31.00 | | 31.03 | | +31.03 |
|---|---|---|---|---|---|
| | 1 | | 40 | | |
| | LMT | PRICE | LMT | | |
| | | 31.10 | 90 | | |
| | | 31.08 | 70 | | |
| | | 31.05 | 10 | | |
| | | 31.03 | 50# | | |
| | 90 | 30.14 | | | |
| | 50 | 30.12 | | | |
| | 25 | 30.11 | | | |
| | 10 | 31.10 | | | |
| 20x, 5, 8 | 33 | MKT | 10X | | |
| | | STOP | | 30# | |

| BAG | | | |
|---|---|---|---|
| | NX BOT | 10 | AT 31.03 |
| | | SELLERS | |
| | 10 BOOK | | |
| | | | |
| | | 0 TO BE ASSIGNED | |

FIG.19E

| BAG | 30.14 | | 31.03 | | −31.03 |
|---|---|---|---|---|---|
| | 90 | | 40 | | |
| | LMT | PRICE | LMT | | |
| | | 31.10 | 90 | | |
| | | 31.08 | 70 | | |
| | | 31.05 | 10 | | |
| | | 31.03 | 40# | | |
| | 90 | 30.14 | | | |
| | 50 | 30.12 | | | |
| | 20 | 30.11 | | | |
| | 10 | 31.10 | | | |
| 20x, 5, 8 | 33 | MKT | 10X | | |
| | | STOP | | 30# | |

FIG.19F

METHOD AND SYSTEM FOR AUTOMATIC EXECUTION OF A SECURITIES TRANSACTION

This application claims the benefit of U.S. Provisional Patent Application Ser. No. 60/226,330, filed Aug. 18, 2000, entitled New York Stock Exchange Direct Plus, the disclosure of which is incorporated herein by reference.

BACKGROUND

1. Field of the Invention

The invention relates to the field of financial transactions and more particularly to the field of automated securities transactions on a securities exchange with a display book and an auction market crowd.

2. Description of the Related Art

In auction exchanges for securities transactions, such as provided by the New York Stock Exchange, Inc. (NYSE), a round lot securities transaction (e.g., a limit or market order) is exposed to the auction market on the floor, where members of the crowd have an opportunity to compete for the transaction. This competition in the crowd for the transaction may improve the eventual execution price for the transaction. On the New York Stock Exchange, this exposure of the round lot transaction to the crowd occurs even when the order is received electronically on the specialist display book and there is an opportunity to execute the order against other electronic orders on the specialist display book. For some investors and institutions, there is interest in having a transaction execute at a known price, foregoing the opportunity for possible price improvement on the auction floor, and if the transaction will execute in a more timely fashion than is available with the traditional auction transaction, that is also desirable.

What is needed are methods and systems to automatically execute securities transactions against a quote, without the added time required for a floor auction, with the understanding that the transaction will not experience possible price improvement as it could from the auction market crowd.

The preceding description is not to be construed as an admission that any of the description is prior art relative to the present invention.

SUMMARY OF THE INVENTION

In one aspect, the instant invention provides a method and system for submitting a securities order to a securities exchange for automatic execution. A quote for a security is determined and a securities order is priced equal to or better than the quote. The order is identified for automatic execution, and transmitted to the securities exchange.

In one aspect, the instant invention provides a method and system for automatically processing a securities order on a securities exchange. A securities order is automatically received, with an indicator requesting automatic execution. At least a portion of the order is automatically executed against a quote price, without exposing the order for possible price improvement.

In one aspect, the instant invention provides a method and system for automatic execution of a securities order on a securities exchange. A current bid or offer price for the security is determined and at least a portion of the order is automatically executed at the bid or offer price, without exposing the order for possible price improvement.

In one aspect, the instant invention provides a method and system for processing a securities order on a securities exchange. A securities order with an indicator requesting automatic execution and a price of the order is received and compared to a quote. If the price of the order is not equal to or better than the quote, the status of the order is changed from automatic execution to regular execution.

In one aspect, the instant invention provides a method and system for processing a securities order on a securities exchange. A securities order with an indicator requesting automatic execution and a size of the order is received, and is compared to a respective interest in the security. If the size of the order is greater than the interest, the status of at least a portion of the order is changed from automatic execution to regular execution.

In one aspect, the instant invention provides a method and system for automatic execution of a securities order on a securities exchange with an auction market crowd. A securities order with an indicator requesting automatic execution and a price of the order is received, and compared to a quote. If the price is equal to or better than the quote, at least a portion of the order is automatically executed without exposing the order to the auction market crowd for possible price improvement.

In one aspect, the instant invention provides a method and system for submitting a securities order for automatic execution on a securities exchange with an auction market crowd. A securities order is identified for automatic execution, and transmitted to the securities exchange for at least partial automatic execution at a quote price. Automatic execution provides for execution without exposure to the auction market crowd for possible price improvement.

In one aspect, the instant invention provides a method and system for execution of a securities transaction on a securities exchange with an auction market crowd. A parity divisor is determined and the securities transaction is executed, with a contra side for the transaction selected according to the parity divisor.

In one aspect, the instant invention provides a method and system for automatic execution of a securities transaction on a securities exchange with an auction market crowd. A quote is automatically updated according to the automatic execution.

In the above aspects of the instant invention, a securities order is automatically executed against a quote, providing shorter order execution times, and execution at a known price. These aspects are balanced against longer order execution times and possible price improvement when the order is exposed to the floor of the securities exchange without automatic execution.

The foregoing specific aspects and advantages of the invention are illustrative of those which can be achieved by the present invention and are not intended to be exhaustive or limiting of the possible advantages that can be realized. Thus, the aspects and advantages of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein:

FIG. 1 illustrates an embodiment of a system according to the instant invention;

FIGS. 7-19 illustrate example transactions using various embodiments according to the instant invention.

Figure 2:
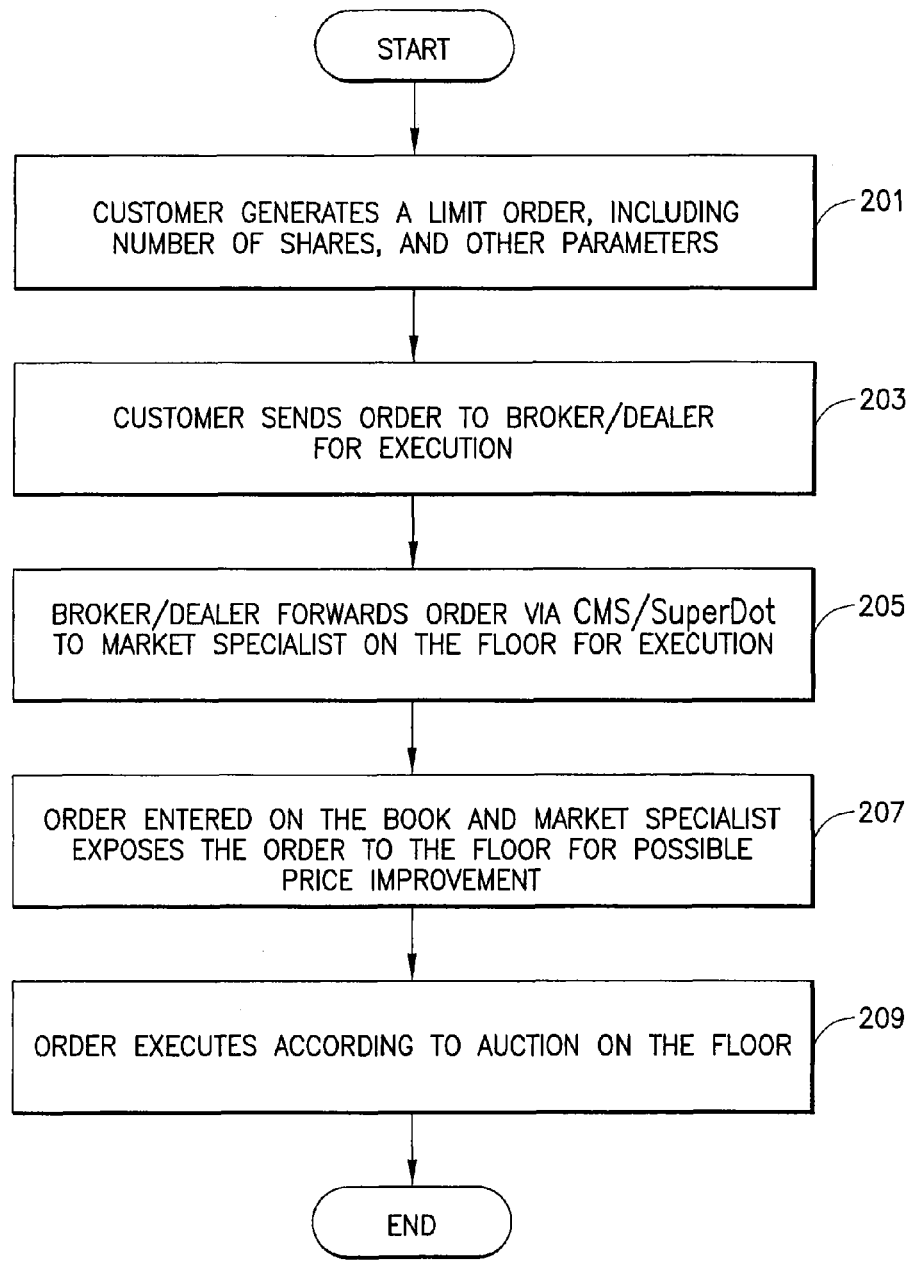
FIG. 2 illustrates a method without the instant invention.

It is understood that the drawings are for illustration only and are not limiting.

DETAILED DESCRIPTION OF THE DRAWINGS

The system and method of the invention are appropriate for use in a Securities Exchange setting, and particularly an exchange with a floor auction market, such as the New York Stock Exchange (NYSE); the American Stock Exchange (AMEX); or the Philadelphia Stock Exchange (PHLX).

In the description that follows, in the interest of clarity, price information will primarily use decimals rather than fractions. Fractions have been the historic measure of securities price information. However, in the near future, it is believed that most or all securities exchanges will transition to decimal pricing and therefore, use of decimals in this description is believed appropriate.

Before describing the instant invention in detail, it is helpful to understand a typical securities transaction, as it might be handled by an exchange. The example below will describe a transaction on the New York Stock Exchange, Inc. (NYSE). For a more detailed understanding of all of the rules and procedures of the NYSE, a person or ordinary skill would know to refer to *New York Stock Exchange GUIDE*, Commerce Clearing House (1984 with updates), the disclosure of which is incorporated herein by reference. First, an investor places an order with a NYSE Member Broker Firm to buy or sell shares in an NYSE listed company. The NYSE Member Brokerage Firm checks the customer's account, provides any requested bid or offer pricing information (i.e., the quote) to the investor, and enters order details. The member brokerage firm stores the order in its order match system, and then transmits the order to the NYSE trading floor, either computer to computer or in some cases by telephone.

At the NYSE, the Common Message Switch/SuperDot (CMS/SuperDot) safely stores the order and then, based upon the order details and programmed parameters, either routes the order to a broker's booth or directly to the trading post specialist for the stock.

If the order is routed to the broker's booth, then at the broker's booth on the Exchange floor, the brokerage firm's clerk receives the order electronically (on a display screen) or by telephone (and then enters it onto the screen). The firm's clerk contacts the firm's floor broker by paging, or by wireless telephone, to alert him/her that new orders have arrived. The order may be wired, phoned or physically picked up. The brokerage firm's floor broker then physically takes the order to the specialist trading post where the stock is traded, and competes with other brokers in the auction market crowd for the best price for the customer and makes the trade.

Alternatively, if the member brokerage firm routes the order to the trading post specialist for the stock, then at the trading post on the Exchange floor, the order appears on the specialist's display book screen, which is an order management system. Although there may be other orders on the display book that could be matched with the new order (if the new order is a limit order), the specialist exposes all orders received on the display book that are at, better or within the current quote to the auction market crowd and makes the trade, seeking price improvement for the customer whenever possible.

Regardless of how the order is delivered to the floor, after the trade, a transaction report is sent to the originating brokerage firm (buying and selling). On the NYSE, this type of order and report through SuperDot to the specialist takes an average 22 seconds to complete.

Once the trade is complete, reports are also sent to Consolidated Tape Displays world-wide, and to the clearing operations.

Also after the trade is complete, post trade processing matches buyers and sellers. This comparison process takes place almost immediately, and is followed by a 3-day clearance and settlement cycle at which time transfer of ownership (shares for dollars or vice versa) is completed via electronic record keeping in the depository.

At the member brokerage firm, after the trade is completed, the transaction is processed electronically, crediting or debiting the customer's account for the number of shares bought or sold.

Finally, shortly after the trade is complete, the investor receives a trade confirmation from his/her member brokerage firm. If shares were purchased, the investor submits payment. If shares were sold, the investor's account is credited with the proceeds. As illustrated in this example, there are a number of steps that occur between the time an investor submits an order and the time the investor receives a trade confirmation. The instant invention provides an opportunity to reduce that time by moving some of the steps out of the order execution cycle, or entirely eliminating certain steps, thereby reducing the time between order submission and trade confirmation. These aspects of the invention are provided in greater detail below.

In one embodiment, the instant invention is an automatic order execution system and method that allows order entry for immediate execution against the published quote. A member firm, or individual investor seeking speed of execution for their order designates the order with a suitable instruction, such as "NX". The order size may be limited, for example to 1,099 shares or less for securities traded in 100 share round lots, and 109 shares or less for securities trading in 10 share round lots. The system and method accommodate limit and market orders, and the order size limits can be changed.

In one embodiment, an "NX" order is entered into CMS by a member firm for normal order validation before routing the order to SuperDot, which determines whether the order is eligible for automatic execution (e.g., size, type and terms). If the order is eligible for automatic execution, it is routed by SuperDot to the specialist display book, for additional checks and immediate execution if eligible. If the order is not eligible for automatic execution, it is generally changed to a regular order and is treated as any other order on the display book, if it meets book eligibility requirements. If the order does not meet eligibility requirements, it is printed at the specialist post.

In one embodiment, the instant invention runs from the first quote of the day until one minute before the exchange closes. Automatic execution is suspended for a number of reasons, including when there is: 1) no quote; 2) a trading halt; 3) better away market; 4) quote is non-firm; 5) wide spread between bid and offer; 6) one minute before closing; and 7) the bid and/or offer is for 1 round lot (the automatic execution is suspended on the side of the 1 round lot bid and/or offer).

In one embodiment, when system 100 receives an eligible order, and automatic execution is not suspended, the order price is compared to the published bid or offer. If the order is a limit order and the limit price is equal to or better than the corresponding bid or offer (e.g., bid is $10.00, and NX sell order is $9.95), then the entire order is automatically executed against the published bid or offer if the order size is less than the size of the respective bid or offer on the display book. Any unexecuted order quantity is placed on the display book as a regular limit order.

The entering firm immediately receives an execution confirmation which will have the system contra of LOC.

In one embodiment, selection of the comparison contra side to the automatic execution depends on a number of conditions. For example, parity divisors set in the display book allow specialist 107 to predetermine the allocation of an NX order. While NX orders can be immediately reported against orders in the book at the bid or offer, specialist 107 must still enter real names after the NX order executes when: 1) crowd participation is indicated by the parity divisor; 2) there is no stock on the book and the parity divisor calls for book participation; or 3) the book is not available due to a frozen condition. In each of these circumstances, specialist 107 must enter real names, such as crowd or system names. Specialist 107 may be forced to take the other side of an automatic execution whenever the crowd/book interest is not available.

In one embodiment, system 100 reports NX order executions to SuperDot, for delivery to the entering firm by CMS.

In one embodiment, an NX execution automatically generates a new quote. This results in automatic decrementing of the bid or offer quantity by the size of the execution. Also, to reduce specialist 107 exposure to stale quotes, the quote is automatically updated when book orders that are part of the quote are canceled, deleted or dropped. System 100 sends these quotes for publication on the consolidated tape. NX orders executed according to the invention are automatically reported to the consolidated tape with a sale condition "E", which notes that the transaction was an automatic execution.

In one embodiment, if the display book is frozen, an NX order will still execute against the published quote. However, such an execution ignores the parity divisor and assumes the trade requires real names to be entered later.

In one embodiment, an NX execution automatically generates a new quote size and reports the trade to the tape, with a notation that the execution was automatic.

These various embodiments are explained in greater detail below.

A System of the Invention

There are many different possible embodiments for systems of the present invention, and description of all the different possible embodiments would be difficult. Accordingly, an example embodiment, comprising various elements, is described with the understanding that there are numerous equivalent elements and systems. FIG. 1 illustrates an embodiment of a system of the present invention. In system 100, buy and sell orders or securities transactions from customers, individual investors or non-member institutions 109 are sent through members of the exchange 101 and are transmitted through the Common Message Switch (CMS) 103 to the Designated Order Turnaround System (DOT) 105, which is known on the NYSE as SuperDot, and are thereby routed to the proper trading floor specialist workstations 107. In system 100, a customer, individual investor or non-member institution 109 who wishes to send a buy or sell order or securities transaction to the trading floor of the exchange 107 for execution must first send their order to an exchange member 101, who in turn submits the order to the floor of the exchange 107 using Common Message Switch 103 and SuperDot 105.

Though not illustrated in FIG. 1, the exchange and members of the exchange have developed a number of procedures with supporting systems to enhance security, rapid processing of orders, audit trails and accountability.

To accomplish the above-described securities transaction, an operator at a terminal 120 of a customer, individual investor or non-member institution 109 enters details of the desired transaction. These details include the particular security, whether the transaction is a sell or buy order or transaction, and any limits on the order or transaction. The operator or terminal 120 attaches the identity of customer, individual investor or non-member institution 109, so that exchange member 101 will know the origin of the order or transaction. Once the order or transaction is complete, the operator forwards the order or transaction to exchange member 101, where the order or transaction is processed, stored, and forwarded to Common Message Switch 103 for handling by one of the traders or specialists 107 on the floor of the exchange.

Using the information connections illustrated in FIG. 1, or other information sources, an individual or non-member institution 109 is also able to track the current quote, including the published best bid and offer prices of securities and interest or size at the respective bid or offer prices. The quote is the best bid and offer for the security, and is published on the consolidated tape. As an example, if specialist 107 has buy orders for 1,500 shares of a particular security on the display book at $120.00, with other buy orders at prices less than $120.00, the best bid is $120.00. If the specialist also has sell orders for 2,000 shares of the same security on the display book at $120.15, with other sell orders at prices greater than $120.15, the best offer is $120.15. Together, the buy orders at $120.00 and sell orders at $120.15 constitute the quote, which is displayed as:

| 120.00 | 120.15 |
|--------|--------|
| 15     | 20     |

Here, the bid is in the upper left, the offer is in the upper right and the respective interest or size, expressed in hundreds of shares, is below each.

If there are no other orders, none of the buy and sell orders on the specialist display book will execute because there is no price overlap.

The steps for automated execution or handing of an order or transaction when it is received by specialist 107 is one aspect of the instant invention, and will be explained in greater detail elsewhere.

After the order or transaction is executed, the order confirmation information is forwarded from the floor 107 to the exchange member 101 via SuperDot 105 and Common Message Switch 103. Exchange member 101 records the order confirmation information and matches the order with the proper customer, individual investor or non-member institution 109 and then forwards the order confirmation to the customer, individual investor or non-member institution 109.

In one embodiment, terminals 120, which run computer software code, are traditional computer workstations, which include a central processor unit (CPU) 122, memory 124 (RAM, ROM or both), data storage 126, removable data storage media 128 and input/output ports 130. These components are interconnected in terminal 120 by a system/data bus 132. Terminals 120 are interconnected at non-member institution by a local area network (LAN), wide area network (WAN), or other equivalent network 134. The various terminals 120 of non-member institution 109 are electronically linked to member(s) of the exchange 101 by appropriate data transmission and reception equipment 136. In the illustrated embodiment, this includes a transmitter 138 and a receiver 140, which are configured to exchange data or information between the non-member institution 109 and the member of the exchange 101.

Exchange member 101, also has terminals 150, which run computer software code and which are similar to terminals 120 at the non-member institution. Terminals 150 are used by operators at exchange member 101 in processing orders or securities transactions from customer, individual investor or non-member institution 109. Terminals 150 include a central processor unit (CPU) 152, memory 154 (RAM, ROM or both), data storage 156, removable data storage media 158 and input/output ports 160. These components are interconnected in terminal 150 by a system/data bus 162. Terminals 150 are interconnected at exchange member by a local area network (LAN), wide area network (WAN) or other equivalent network 164.

The various terminals 150 of exchange member 101 are electronically linked to customer, individual investor or non-member institution 109 by appropriate data transmission and reception equipment 166. In the illustrated embodiment, this includes a transmitter 170 and a receiver 168, which are configured to exchange data or information between the exchange member 101 and the non-member institution 109.

Exchange member 101 also includes electronic links to the Common Message Switch 103 of the exchange by appropriate data transmission and reception equipment 180. This includes a transmitter 182 and a receiver 184, which are configured to exchange data or information between exchange member 101 and similar data transmission and reception equipment 186 of Common Message Switch 103. In one exchange, the data transmission and reception equipment 186 are termed a Common Access Point (CAP), providing a standardized set of access protocols for the electronic connection of different entities to the exchange.

In FIG. 1, transmitters 138, 170, 182 and receivers 140, 168, 184 are illustrated as separate pieces of equipment. However, the state of data transmission equipment is such that a single piece of equipment may typically perform both transmission and reception functions using a common media, such as coaxial cable, fiber optic cable or twisted pair wiring. In this configuration, it may be difficult to separate a transmitter from a receiver. The equipment or device may be a single piece of equipment performing both functions. However, depending on the data exchange format and media it is also possible that there are separate transmitters and receivers, such as for satellite, microwave or infrared.

In FIG. 1, it is also understood that there are non-illustrated elements of exchange member 101, customer, individual investor or non-member institution 109, Common Message Switch 103, SuperDot 105 and floor workstation 107. It is further understood that multiple customers, individual investors or non-member institutions may be connected to a single exchange member, and the multiple exchange members are connected to Common Message Switch 103. It is also possible a customer, individual investor or non-member institution has connections to more than one exchange member. It is also possible that an exchange member has connections to more than one exchange. It is further possible that different exchanges have connections with each other.

As indicated above, Common Access Point 186 is a state of the art communications infrastructure that serves as a universal bridge between the NYSE's business services and the networks of NYSE members, sponsored non-members (e.g., institutions, brokers/dealers, and individual investors), and vendors. Common Access Point is designed to simplify member firm access to a variety of NYSE systems and services using industry-standard protocols and structured data formats. Also, the design of Common Access Point enables member firms to access NYSE business services while maintaining the security and operational integrity of NYSE systems and networks. Common Access Point supports (a) multiple types of connections through multiple providers, (b) multiple types of sessions, and (c) multiple messaging standards over a common Transmission Control Protocol/Internet Protocol (TCP/IP) network.

Order information flowing to and from the NYSE is supported in the Floor Communication Standard (FCS) message format traditionally used by the NYSE or in the industry-standard Financial Information eXchange (FIX) message format. Other formats are supported as they become widely accepted and utilized in the securities industry.

Common Access Point authenticates incoming connections from hosts, secure sessions and individual users. It also provides appropriate data confidentiality, and ensures the integrity of NYSE systems against external threats.

Member firms can choose to connect to Common Access Point either directly, through a financial service bureau, through a public extranet provider, or through an Internet service provider (ISP), depending upon their needs. Depending on the access method, a variety of physical connection types are supported, ranging from dial-up (via third parties) to 155 Mbps circuits. When the member firm's business requirements warrant it, a member firm can run multiple NYSE business services over a single physical connection. Common Access Point is reachable at two sites, and redundant paths from multiple member firm lines or sites are available in order to maintain the high standards of availability member firms have come to expect from the NYSE.

The information carried in a messaging format such as FIX is conveyed to the NYSE via a "session-layer" protocol that then uses TCP and IP to deliver the data. Common Access Point supports a number of session protocols to meet a range of potential needs. These session protocols are used to provide security services and a measure of standardization between the network and the application.

The role of the Common Message Switch (CMS) 103 is to receive, validate and pass orders and administrative messages received from member firms to other NYSE systems. In addition, CMS sends Execution Reports, responses to administrative messages, and Status messages back to the member firms.

The Common Message Switch (CMS) connects to each member firm via Common Access Point (CAP) and lines that handle all of the traffic to and from the NYSE. This ensures that the traffic to and from the member firms is kept private and isolated from any interference. The line can be defined for use by a single mnemonic, or for additional mnemonics where order flow needs to be segregated.

Without the instant invention, for all round lot trades on a securities exchange with both auction market crowd and electronic order handling (e.g., the NYSE, the AMEX or the PHLX), even if the trade is received electronically on the specialist display book, the transaction or trade is always completed after exposing the transaction to the auction crowd on the trading floor, where the trade may experience price improvement. This applies to limit buy and sell orders, as well as market buy and sell orders.

One difference between market and limit orders without the instant invention is that with a limit order exposed to the auction crowd on the trading floor, the transaction will not execute at a price that is "worse" than the limit price, but with price improvement, it can execute at a "better" price than the limit price. For a market order, the order executes at the market price, which is established by the floor auction.

To assist traders in the floor auction, a market specialist keeps track of and publishes a current best bid and offer (the quote) for the security. The bid reflects the best price that a party will pay to purchase the security, while the offer reflects the best price that a party will accept in a sale of the security. The difference between the bid and offer is called the spread, and under this arrangement, the offer is always greater than the bid. The specialist, in her role as market maker, keeps the spread small by supplying interest (both price and size) on the opposite side of the quote where there is not sufficient interest. This helps to maintain the market. As the bid and offer change, the specialist constantly updates the quote and publishes the update on the consolidated tape, so that a current quote is available to investors during the time that the market is open.

Associated with the best bid and offer is a respective interest in the security or size. Although the interest may exist in incremental units of stock (i.e., odd lots or mixed lots), the interest is typically expressed in round lots of 100 shares, or blocks of 10,000 shares. In the same way that the specialist updates the bid and offer, she also constantly updates and publishes the respective interest on the consolidated tape.

FIG. 2 illustrates an embodiment of a method for executing securities transactions without the instant invention. At step 201, customer, individual investor, or non-member institution 109, selects the security for the transaction and generates a limit order for the securities transaction. The limit order includes information such as the particular security, the number of shares, the limit price, whether the transaction is a buy or sell order and any time limits for the order.

At step 203, customer, individual investor or non-member institution 109 sends the limit order to their broker/dealer for execution. The broker/dealer, who is a member of the securities exchange and therefore has exchange privileges, receives the order and ensures that it is satisfactory. This check includes verification that the customer has an account, that any credit requirements are satisfied and that the security is actually trading.

At step 205, broker/dealer 101 forwards the limit order to market specialist 107 on the exchange floor, via CMS/SuperDot.

At step 207, the limit order is automatically entered on the specialist display book. If the limit price of the buy order for that particular security is priced equal to or greater than the offer, or the transaction is a sell order, which is priced equal to or less than the bid, the market specialist exposes the order to the floor for possible price improvement. Otherwise, if the limit price is outside the quote for that particular security, the order remains on the book until it is at or better than the quote, or otherwise expires.

At step 209, once the order is exposed to the auction market for price improvement, it will execute according to the floor auction. As a result, if price improvement is available, the limit order will execute at a price that is "better" than the limit price. Otherwise, if price improvement is not available and assuming that the limit price is still available on the floor or in the book, the transaction will execute at the limit price.

Though not illustrated in FIG. 2, there are additional steps involved in reconciling the securities transaction, such as identifying the contra side for the transaction, and reporting the order execution price and contra side of the transaction. It should be noted, that for every order or securities transaction that is executed on the floor, there is a corresponding contra side.

It should be noted, that for some odd lot trades, there is an aspect of automatic execution on the NYSE. For these trades, market orders are executed off the National Best Bid or Offer (NBBO), while limit orders are executed off the NYSE last sale. However, for odd lot trades, the opposite side is the specialist.

A Method of the Invention

Figure 3:
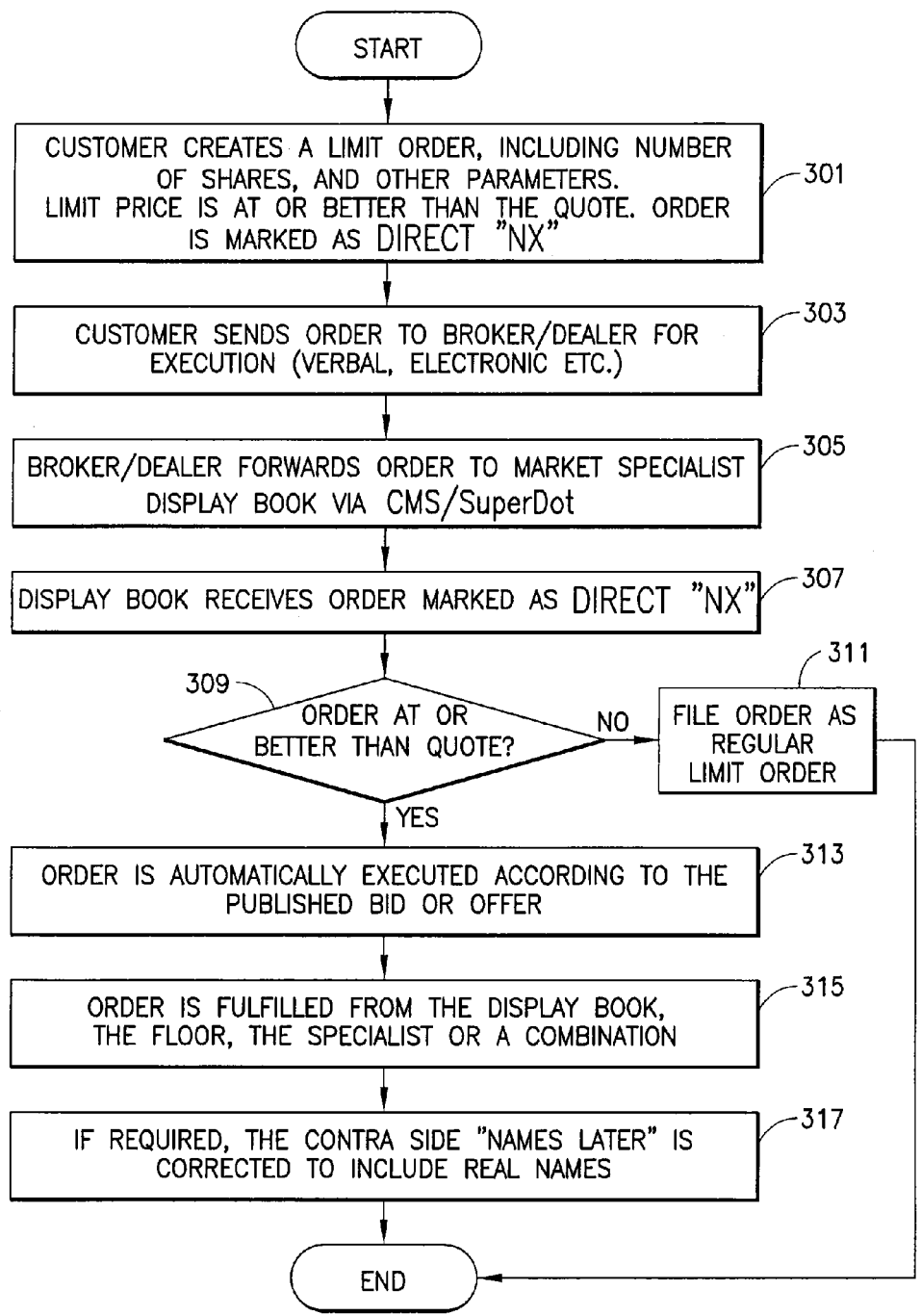
FIG. 3 illustrates an embodiment of a method according to the instant invention.

FIG. 3 illustrates an embodiment of the method of the invention. In this embodiment, at step 301, customer, individual investor or non-member institution 109 creates a limit order. This limit order is similar to the limit order described with reference to step 201 of FIG. 2, but in addition, the customer also reviews the current quote (the bid and the offer) for that particular security and uses that quote information to set the limit price of the transaction. For example, if the best bid is $120.00 for 1,500 shares, and the best offer is 2,000 shares at $120.15. The quote is:

| 120.00 | 120.15 |
|--------|--------|
| 15     | 20     |

If the customer wants to sell the particular security, they must set the limit price for their sell order at or better than the bid, which is therefore $120.00 or less. In this way, the customer's sell order can take advantage of a trade at the current quote, assuming that the customer is willing to forego the opportunity for price improvement. Likewise, if the customer wants to buy the particular security, they must set the limit price for their buy order at or better than the current offer, which is therefore $120.15 or more. Also different from step 201 of FIG. 2, the customer indicates their desire for automatic execution (without the opportunity for price improvement) by designating the transaction "NX", for automatic execution. This signals to the broker/dealer and the exchange that the customer wants the order automatically executed without exposure to the auction market for possible price improvement.

In many embodiments, the customer or broker/dealer will have a real-time quote stream and will use that quote stream in setting the limit price for the transaction at step 301 at or better than the quote for the particular security. However, it is also possible that the customer will set the limit price without knowledge of or access to a real-time quote stream. In this situation, if the limit price for the transaction is at or better than the quote, the transaction can automatically execute at the quote, and if not, it will not automatically execute, as discussed in greater detail below.

Once customer, individual investor or non-member institution 109 has created the limit order and designated the order as NX, for automatic execute, then at step 303, the limit order is forwarded to the broker/dealer 101. The method used to forward the order may include electronic, voice or in person.

At step 305, broker/dealer 101 reviews the limit order, checking for errors and verifying any customer credit requirements. The broker/dealer also notes that the limit order is marked NX and may therefore handle it in a more expeditious manner to enhance the timeliness of the transaction. Once any required checks are completed, the broker/dealer forwards the transaction to the market specialist 107 via CMS/SuperDot, with the destination being the market specialist display book.

Although FIG. 3 illustrates customer 109 designating the order as NX at step 301, it is also possible that broker/dealer 101 designates the order as NX at step 305. This may be to expedite the order, or because it is easier for broker/dealer 101 to make the designation than customer 109.

At step 307, system 100 of the invention receives the transaction and the indication for automatic execution (NX) is noted.

At step 309, system 100 of the invention performs a number of checks to see if automatic execution is available. These checks are discussed elsewhere with reference to FIGS. 4 and 5. System 100 also checks to ensure that the limit price of the transaction is at or better than the quote for that particular security to ensure that the order can be automatically executed. For example, as discussed above, if the transaction is a limit sell order with a price of $119.95, and the current bid is $120.00, system 100 can automatically process the transaction at the bid of $120.00. However, it is possible that the quote has changed in the time interval between the customer creating the limit order and receipt of the limit order on the display book. So, if the bid is no longer $120.00, because there are no longer any buy orders on the book at prices of $120.00 or less, and the best bid is now $119.80, system 100 is unable to automatically execute the customer's limit sell order against the quote ($119.80) at the price of $119.95. In this case, at step 311, system 100 changes the limit order from automatic execute to a regular limit order and the order is handled as it would be handled without the instant invention.

If, however, the price of the order is at or better than the quote, then at step 313, system 100 automatically executes the order against the current quote. The automatic execution, and price of execution, is reported to customer, individual investor or non-member institution 109, via SuperDot/CMS 105, 103 and broker/dealer 101. In this way, the customer knows very quickly that the transaction was executed and the execution price of the transaction.

Because the transaction is executed against the quote, and not against a particular contra side, a particular contra side is not necessarily identified at step 313 when the transaction is automatically executed. Therefore, system 100 may still need to perform this step. Thus, at step 315, system 100 completes the steps required to fill the order and identify the contra side.

In one embodiment, the steps for identifying the contra side include use of a parity divisor.

The parity divisor is used by system 100 to determine how to allocate an NX order when it is automatically executed in accordance with NYSE Rule 72, which governs priority, parity and precedence within a trade crowd. The divisor is a numeric code that a display book user, typically specialist 107, enters for both the bid and offer side. The divisor indicates how system 100 will assign contra sides to an automatically executed NX order. Each stock in a display book has its own parity divisor settings.

In one embodiment, there are six options for the parity divisor, ranging from zero (0) to five (5). They are: 0) crowd only, no display book; 1) display book is allocated 100%; 2) display book is allocated 50%, the balance requires real names; 3) display book is allocated 33%, the balance requires real names; 4) display book is allocated 25%, the balance requires real names; and 5) display book is allocated 20%, the balance requires real names.

For each automatic execution, the quantity allocated to the display book is determined by the following formula, as long as the divisor is greater than zero.

$$AllocatedBOOK = Roundup * \left( \frac{ExecutionQuantityInRoundLots}{ParityDivisor} \right)$$

where, Roundup is taking any number with a fractional portion and rounding up to the next whole number, that is round lot. For example, 2.000000001 is rounded up to 3.

Of course, when the parity divisor is zero (0), the amount allocated to display book is zero.

At the beginning of the day, the parity divisors on both the bid and offer side default to one (1). This includes any time a stock is down-line loaded, such as during a recovery or a stock move.

When the display book is frozen (either explicitly via the freeze key, or implicitly by displaying a template that freezes the book), the parity divisors for both the bid and offer side are implicitly set to zero for the duration of the freeze. However, this does not change the actual status of the parity divisor as set by the specialist. When the freeze is removed, the parity divisors set by the specialist are used for subsequent transactions.

If, as a result of an NX execution, tick-sensitive orders are filed at a price that is better than the quote, the parity divisor is set to zero temporarily. This state is removed by a specialist execution, refiling or quote. In this state, if there is another execution at the published (old) quote, the display book will refile tick-sensitive orders as of the previous filing date and time.

In one embodiment, the contra side is selected entirely from the orders that are in the specialists display book, which corresponds to a parity divisor of one (1). This contra side selection is automatic using software that supports the specialist book. The execution report is always immediately sent back to the entering firm. The trade comparison information will be delayed if the contra is NX (real names required).

In another embodiment the contra side is selected entirely from the floor or by the specialist, filling the order in their role as a market maker, with the order filled according to the quote and the existing interest from the floor. In this manner, traders on the floor also have an opportunity to fill the order at the execution price. This corresponds to a parity divisor of zero (0). For an NX order, this is done without price improvement.

In another embodiment, the contra side is selected from a combination of the display book, floor or specialist. This corresponds to parity divisors of 2, 3, 4, or 5. This may involve dividing the order into multiple groups with some groups filled from The book, some groups filled from the floor and some groups filled by the specialist. Of course there are multiple other variations available. The variation used to satisfy the contra side may be according to the auction market principles of priority and parity, as codified in NYSE Rule 72, the disclosure of which is incorporated herein by reference.

Once the contra side or sides are identified, then at step 317, system 100 updates the "names later" for any required securities transaction to include the actual real name information on the contra side or sides. In this way, system 100 is able to finish the transaction by having an identity of a particular contra side for the transaction, to complete the order and transaction reconciliation that is required at the end of the trading day.

Not illustrated in FIG. 3 are the steps for transaction or order confirmation, audit and order reconciliation. In the order or transaction confirmation process the executed transaction information is sent from the exchange floor 107 to customer, individual investor or non-member institution 109. The confirmation steps are somewhat a reverse of the order steps and involve sending the confirmation from the exchange floor 107 through SuperDot 105 and CMS 103 to the exchange member 101, where the order is forwarded to customer, individual investor or non-member institution 109.

Also not illustrated in FIG. 3 are steps whereby the automatic execution is not available, such as lack of a firm published price or quote for the security, an automatic execution order received before a published price or quote is available, a gap in the published quotation because of an influx of orders on one side of the market, the published price or quote is 100 share size, a trading halt for the security, the order size is outside 100 to 1,099 shares, or the order is received after an end of trading day cut-off (e.g., after 3:59:00 p.m.). According to NYSE rules, automatic execution may not be available if the individual submitting the transaction has too many orders within a certain time (e.g., two orders for the same security received from the same party within a 30 second interval). It is also possible that part of the order can be executed according to the automatic execution described above and that part can not be executed according to the automatic execution.

In one embodiment, the size of an order identified for automatic execution must be 1,099 shares or less.

In one embodiment, the size (or interest) of the quote, either bid or offer, must be greater than 100 shares (one round lot).

In other embodiments, automatic execution is not available if: 1) the published quotation is a non-firm quotation (e.g., the NYSE published quotation is a non-firm quotation); 2) the published quotation has been gapped for a brief period because of an influx of orders on one side of the market, and the size of the published quotation is 100 shares at the bid and/or offer; 3) a better price exists in another participating market center for a single-sided order identified for automatic execution; 4) the published bid or offer is 100 shares; 5) a transaction outside the published quotation is being completed; or 6) trading in the security has been halted.

Some of these other aspects and embodiments of the instant invention are illustrated with reference to FIG. 4. At step 402, SuperDot 105 receives an order from CMS 103.

At step 404, system 100 determines whether the order is designated as an NX order, thereby requesting automatic execution against the quote. If the order is not designated as an NX order, at step 406, system 100 performs other normal validation procedures on the order, and the order is passed to the display book.

If the order is designated NX, then at step 408, system 100 determines whether the order is a market order. If the order is a market order, then at step 410, system 100 determines whether NX market orders are being accepted. This is because in one embodiment, system 100 accepts limit NX orders, but does not accept market NX orders. In another embodiment, system 100 accepts both limit NX orders and market NX orders. If system 100 is not accepting market NX orders, then at step 412, system 100 marks the order as NXX in the Try To Stop (TTS) field on line 3A, and then at step 406, system 100 performs other normal validation steps and passes the order to the display book.

If the order is a market NX order and system 100 is accepting market NX orders, then at step 414, system 100 determines whether the order size is greater than 1,099 shares. If the order size is greater than 1,099, then at step 416, system 100 determines whether the order originated at a booth routing firm. If the order originated at a booth routing firm, then at step 412, system 100 marks the order as NXX in the TTS field on line 3A, and then at step 406, system 100 performs other normal validation steps and passes the order to the display book.

If the order did not originate at a booth routing firm, then at step 418, the order is rejected outright. This is one of the few circumstances under the instant invention where an order is rejected, and not handled in some other manner.

If the order size is 1,099 shares or less, then at step 420, system 100 determines whether the global NX flag is on. If the global flag is not on, then at step 412, system 100 marks the order as NXX in the TTS field on line 3A, and then at step 406, system 100 performs other normal validation steps and passes the order to the display book.

If the global NX flag is on, then at step 422, system 100 determines whether the NX flag for the particular stock is on. If the stock NX flag is not on, then at step 424, system 100 marks the order in the TTS field on line 3A as NXX, and then at step 406, system 100 performs other normal validation steps and passes the order to the display book.

SuperDot checks if it is a market order with the market order flag set to On. If no, system 100 appends NXX, if yes, system 100 appends NX.

If the NX flag for the particular stock is on, then at step 426, system 100 determines whether the display book version flag is ok for NX orders. If the display book version flag is not ok, then at step 424, system 100 marks the order in the TTS field on line 3A as NXX, and then at step 406, system 100 performs other normal validation steps and passes the order to the display book.

Figure 4B:
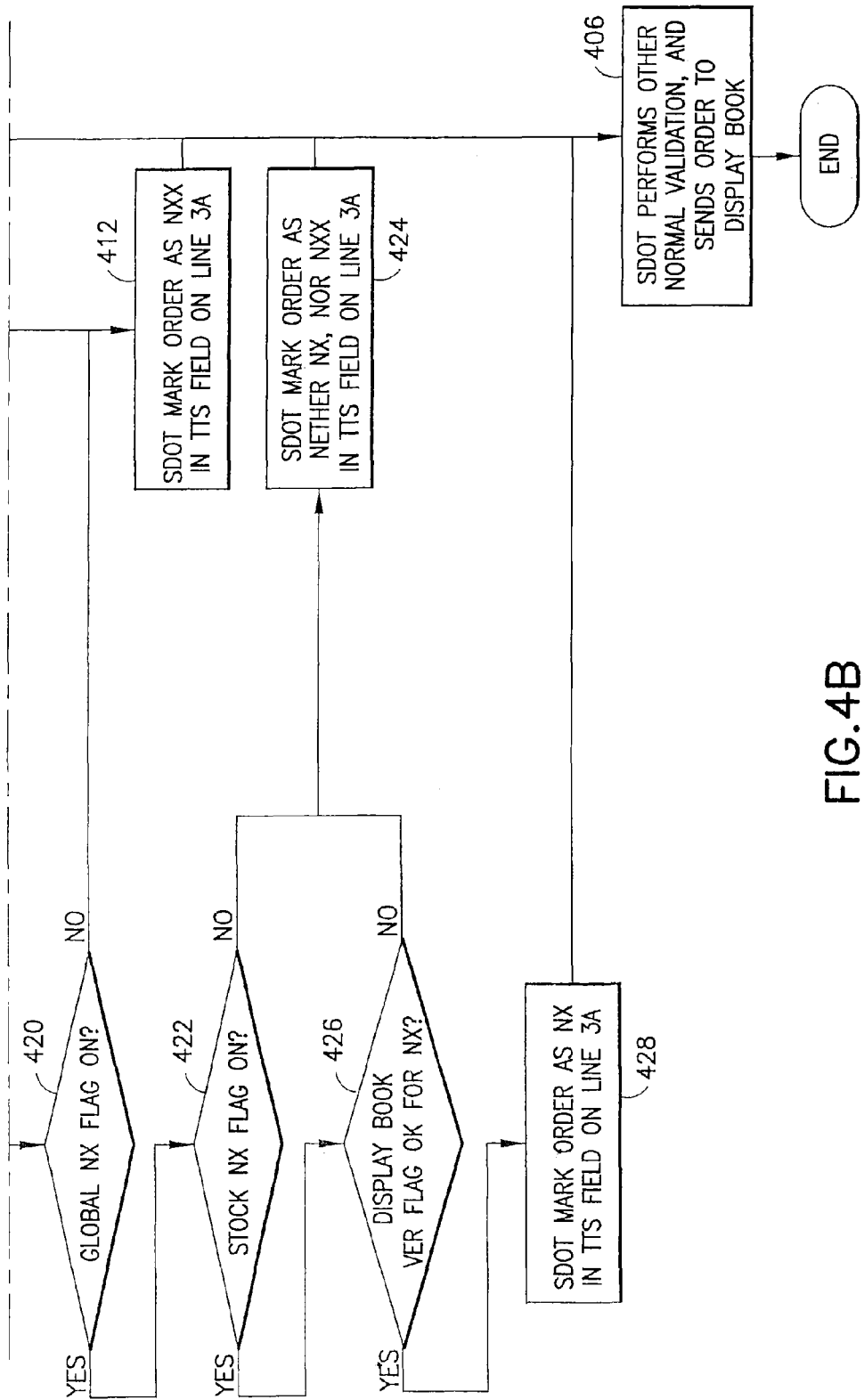
FIG. 4 illustrates an embodiment of a method according to the instant invention.

In one embodiment, the test steps described with reference to FIG. 4, are performed by SuperDot. Once SuperDot has completed those tests, the order is passed to the display book, where additional test steps are performed before the order is automatically executed.

Figure 5A:
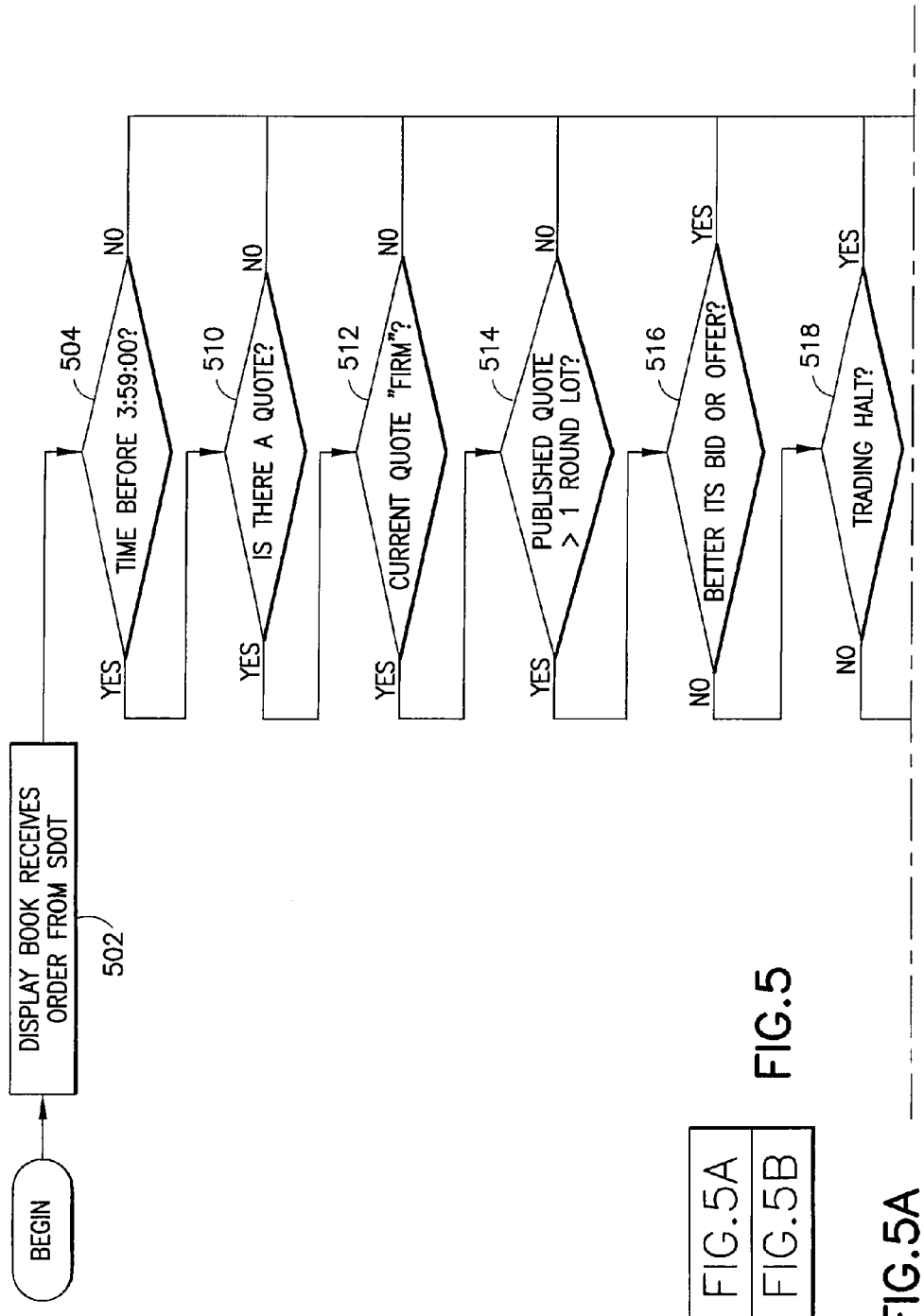
FIG. 5 illustrates an embodiment of a method according to the instant invention.
Figure 5B:
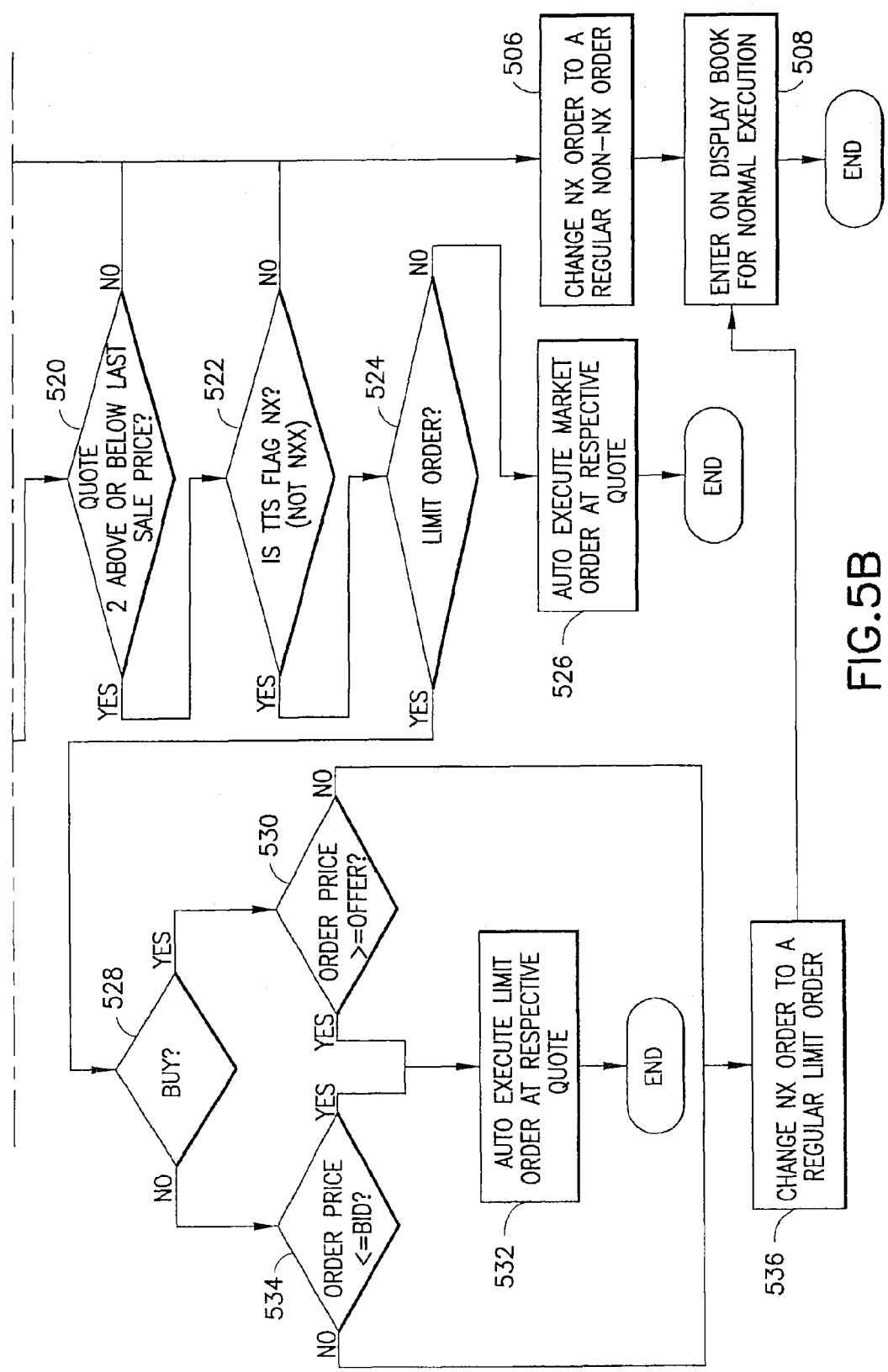

Referring to FIG. 5, the test steps performed by the display book in one embodiment are illustrated. At step 502, the display book of system 100 receives the order from SuperDot.

At step 504, system 100 determines whether the market is open and the time is before 3:59:00 p.m. If the market is not open, or the time is after 3:59:00 p.m., then at step 506, system 100 changes the order to a non-NX order, and at step 508 enters the order on the display book for normal execution.

If the market is open and the time is before 3:59:00, then at step 510, system 100 determines whether there is a quote for the security. If there is no quote, then at step 506, system 100 changes the order to a non-NX order, and at step 508 enters the order on the display book for normal execution.

If there is a quote, then at step 512, system 100 determines whether the current quote is a "firm" quote. A firm quote is a quote by the securities exchange where the order is being presented for execution. This avoids auto execution against a quote from another exchange. If the current quote is not "firm", then at step 506, system 100 enters the order on the display book for normal execution.

If the quote is "firm", then at step 514, system 100 determines whether the published quote is for more than one round lot. If the quote is not for more than one round lot, then at step 506, system 100 enters the order on the display book for normal execution.

If the quote is for more than one round lot, then at step 516, system 100 determines whether there is a better Intermarket Trading System (ITS) bid or offer. If there is a better ITS bid or offer, then at step 506, system 100 enters the order on the display book for normal execution.

If there is no better ITS bid or offer, then at step 518, system 100 determines whether there is a trading halt for the security. If there is a trading halt, then at step 506, system 100 enters the order on the display book for normal execution.

If there is no trading halt, then at step 520 system 100 determines whether the quote is more than $2.00 above or below the display book last sale for non-high-priced stocks, or more than $10.00 above or below the display book last sale for high-priced stocks. If there is a quote that is more than $2.00 above or below the display book last sale for non-high-priced stocks, or more than $10.00 above or below the display book last sale for high-priced stocks, then at step 506, system 100 enters the order on the display book for normal execution.

If the quote is less than $2.00 above or below the display book last sale for non-high-priced stocks, or less than $10.00 above or below the display book last sale for high-priced stocks, then at step 522, system 100 determines whether the TTS field on line 3A is marked NX, (not NXX). If the TTS field on line 3A is not NX, then at step 506, system 100 enters the order on the display book for normal execution.

If the TTS field on line 3A is NX, then at step 528, system 100 determines whether the order is a buy order. If it is a buy order, then at step 530, system 100 determines whether the order price is equal to or better than the offer. If the order price is equal to or better than the offer, then at step 532, system 100 automatically executes the order at the respective quote.

If the order is a sell order, then at step 534, system 100 determines whether the order price is equal to or better than the bid. If the order is equal to or better than the bid, then at step 532, system 100 automatically executes the order at the respective quote.

If system 100 determines at steps 530 or 534 that the order is not equal to or better than either the offer or bid, then at step 536, system 100 changes the NX order to a regular limit order, and at step 508 enters the order on the display book for normal execution.

The steps illustrated in FIG. 4 and most of FIG. 5 up to automatic execution are performed for each NX order before the order is considered qualified and eligible for automatic execution.

Figure 6:
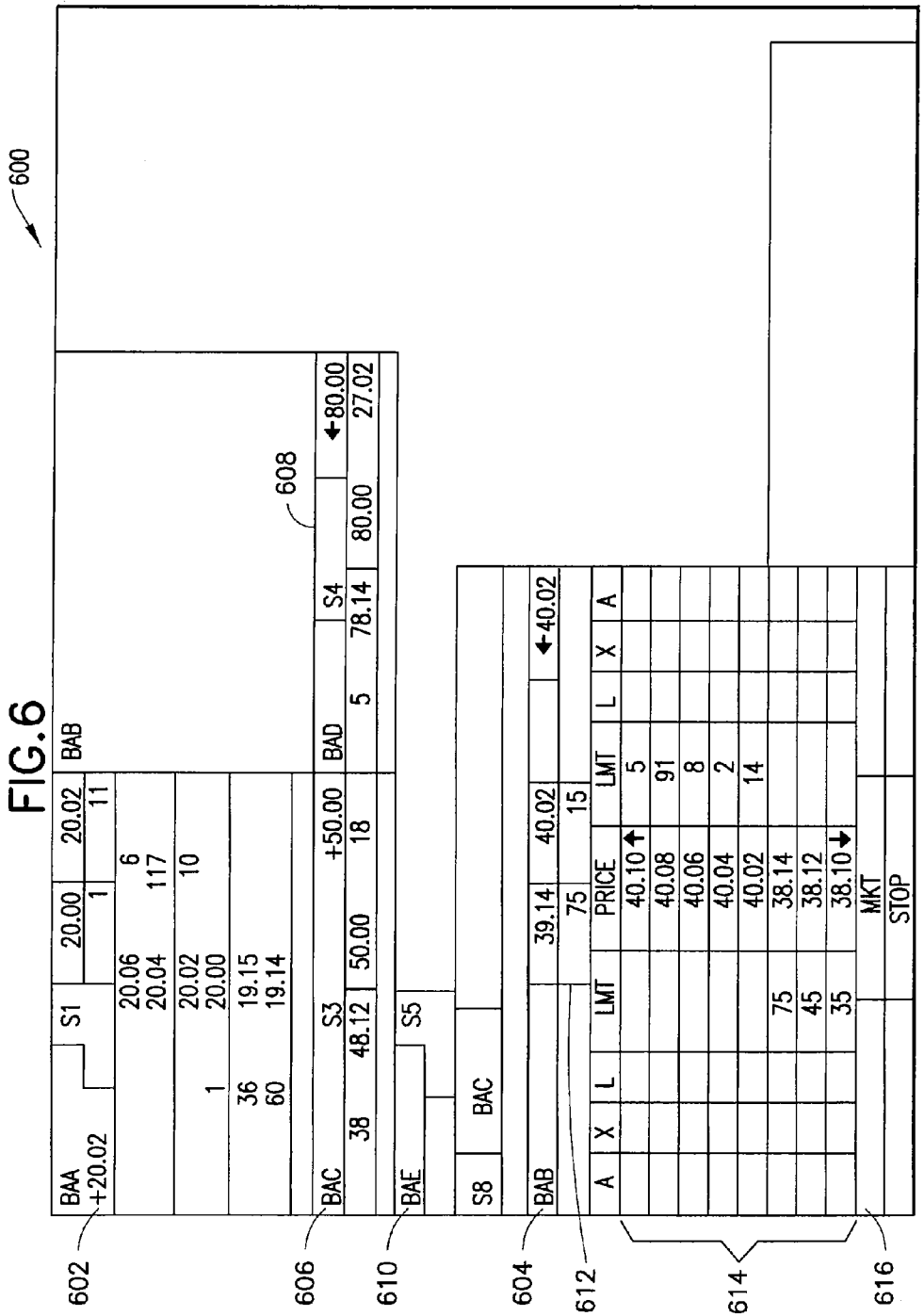
FIG. 6 illustrates an embodiment of a display book according to the instant invention.

It is helpful to understand what the display book looks like to the specialist. Accordingly, FIG. 6 provides an example of a display book screen 600. The specialist handles a number of different securities on the same display book screen. In FIG. 6, these different securities are represented by the symbols BAA (602), BAB (604), BAC (606), BAD (608) & BAE (610). As illustrated, the specialist may configure the display with different size windows for individual securities. In the illustration, the security BAB (604) is illustrated in a larger active window, which helps to illustrate some of the different aspects of the invention. For example, the identity of the security is provided, in addition to the current quote (612). The quote is 39.14 bid for 7,500 shares (here the display book is using fractions rather than decimals), and 1,500 shares offered at 40.02.

Below the security identity and quote, the current orders on the book are displayed in a sorted order (614) from highest price at the top to lowest price. In the illustration, the bid for 7,500 shares at 39.14 is all from limit order(s) (LMT), and the offer of 1,500 shares at 40.02 is also from limit order(s) (LMT) of 1,400 shares at 40.02 and 100 shares from crowd interest or possibly the specialist at 40.02. If there were any market orders, they would appear at (616).

To help illustrate how different circumstances are handled by the instant invention, the following examples are provided. All of the examples use the security BAG, and although aspects of the instant invention are described with decimal pricing in other sections, the examples below use fractional pricing.

I. EXAMPLE 1

Referring to FIG. 7, a normal execution against the display book is illustrated. In this example, the stock is BAG (702), and the published quote is the same as the display book quote (704) (no crowd). As illustrated in FIG. 7A, the quoted market is 32.00 bid for 2,000 shares and 5,000 shares offered at 32.01, which is displayed as:

| 32.00 | 32.01 |
|-------|-------|
| 20    | 50    |

As illustrated in FIG. 7A, the parity divisors on the bid (710) and offer (712) side are both 1 (meaning all book), and the book is not frozen.

Figures 7B, 7C:
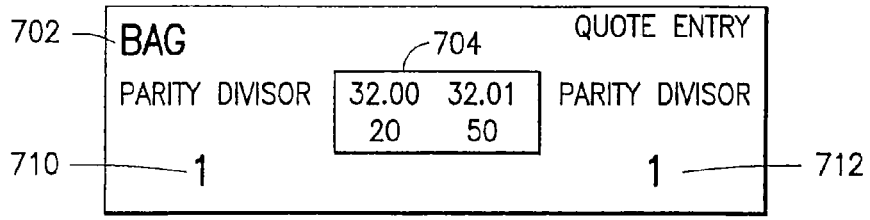

In FIG. 7B, the display book consists of the following orders, in effective sequence (and expressed in round lots):
  2 DOT (for Designated Order Turnaround, representing an electronically submitted market order)
  8 LMT (at 32.00) (representing an electronically submitted regular limit order)
  6 DOT
  12 LMT (at 32.00)

On the display book, the two market orders (2 DOT and 6 DOT) are identified at 706 & 708, while the 8 LMT and 12 LMT at 32.00 are identified at 714.

With the display book and market in the condition illustrated in FIG. 7B, an investor submits an NX limit order to sell 1,000 shares at 32.00. This order is submitted through CMS and SuperDot with an indicator requesting automatic execution (NX). Before the NX order arrives at the display book it is processed according to FIG. 4, and after it arrives at the display book it is processed according to FIG. 5.

Because the order is at or better than the quote, and the bid quote size is sufficient to cover the NX sell order of 1,000 shares, for NX execution report processing, system 100 reports 1,000 shares of NX order sold to SuperDot for delivery to the entering firm via CMS. NX is appended to the execution report, and the give up is 2 DOT, 8 LMT.

The contra side allocation proceeds according to their priority in time and price, so the first allocation is to the 2 DOT (200 shares at the market), and the balance (800 shares) of the 1,000 share order is to the 8 LMT (800 shares). Since the NX limit order was for 1,000 shares, that is all that needs to be allocated. Thus, for contra execution report processing, system 100 reports 200 shares of DOT and 800 shares of LMT bought to SuperDot for delivery to the entering firm via CMS. The give up is 2 DOT and 8 LMT.

For Market Data System (MDS) trade reporting, system 100 reports the trade with "E" indicator appended, and the report is sent to MDS (1,000 traded at 32.00).

For MDS quote reporting, the quote is automatically updated and published (market 32.00 bid for 1,000 shares and 5,000 shares offered at 32.01) with NX autoquote indicator for surveillance use only, which is displayed as:

| 32.00 | 32.01 |
|-------|-------|
| 10    | 50    |

The display book window is updated as illustrated in FIG. 7C, with the limit side 716 of the book reduced by 800 shares from 2,000 shares to 1,200 shares. The last sale and tick are updated, and the bid quote size is reduced by 1,000 shares to 1,000 by autoquote. Because the order was all against the book there is no requirement to provide real names. The specialist must manually update the quote to reflect book interest.

II. EXAMPLE 2

Referring to FIG. 8, an NX execution against the crowd, with no orders on the display book is illustrated. In this example, there are no eligible bid orders at 32.00 on the book, and the published bid is all crowd. The market is 32.00 bid for 20,000 shares and 5,000 shares offered at 32.01, which is displayed as:

| 32.00 | 32.01 |
|-------|-------|
| 200   | 50    |

The parity divisors on the bid (802) and offer (804) sides are both 1 (meaning all book), and the book is not frozen.

Figures 8A, 8B, 8C:
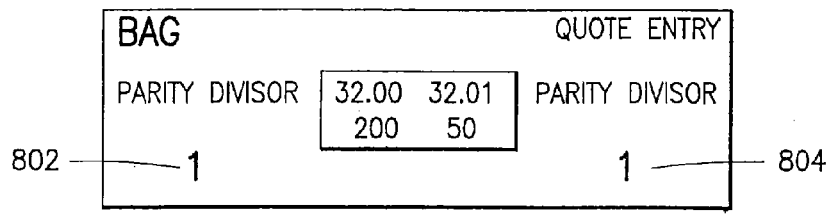

With the display book and market in the condition illustrated in FIG. 8B, the investor submits an NX limit sell order for 1,000 shares at 32.00. This order is submitted through CMS and SuperDot with an indicator requesting automatic execution (NX). The NX order is processed as described above with reference to FIGS. 4 and 5.

Because the order is at or better than the quote, and the bid quote size is sufficient to cover the NX sell order of 1,000 shares, for NX execution report processing, system 100 reports 1,000 shares of NX order sold to SuperDot for delivery to the entering firm via CMS. NX is appended to the execution report, and the give up is 10 NX.

There is no contra execution report processing because the trade is against NX.

For MDS trade reporting, system 100 reports the trade with "E" indicator appended, and the report is sent to MDS (1,000 traded at 32.00).

For MDS quote reporting, the quote is automatically updated and published (market 32.00 bid for 19,000 shares and 5,000 shares offered at 32.01) with NX autoquote indicator for surveillance use only, which is displayed as:

| 32.00 | 32.01 |
|-------|-------|
| 190   | 50    |

The display book window is updated as illustrated in FIG. 8C. Because the order was not against the book, the limit side of the book is unchanged. The last sale and tick are updated, and the bid quote size (806) is reduced by 1,000 shares by autoquote. Because the order was all against the crowd and the give up was NX, specialist 107 must provide real names.

Figure 8D:
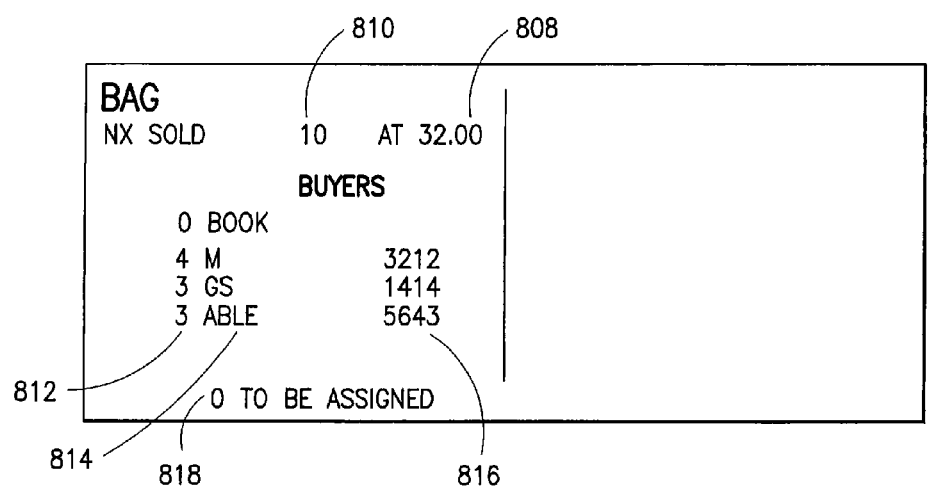

Referring to FIG. 8D, the left side of the real names template shows NX Sold, the right side is blank, and the price (808) defaults to 32.00, with NX defaults to 1,000 shares (810). Specialist 107 enters contra side quantities (812), names (814), and (optional) badge numbers (816). When all 1,000 shares are allocated, the template shows 0 shares (818) remaining to be assigned and specialist 107 presses either the smart report key, or done key.

The display book sends a real names administrative message to SuperDot, modifying the original trade with the needed names.

III. EXAMPLE 3

Referring to FIG. 9, an NX execution with distribution between the book and crowd is illustrated. In this example, the stock is BAG (902), the published quote (904) is both book and crowd on the bid side. The market is 32.00 bid for 221,000 shares and 5,000 shares offered at 32.01, which is displayed as:

| 32.00 | 32.01 |
|-------|-------|
| 221   | 50    |

The parity divisor on the bid side (906) is 4 (meaning 25% to the book and 75% to the crowd), and on the offer side (908) is 1 (meaning all book). The book is not frozen.

Figures 9A, 9B, 9C:
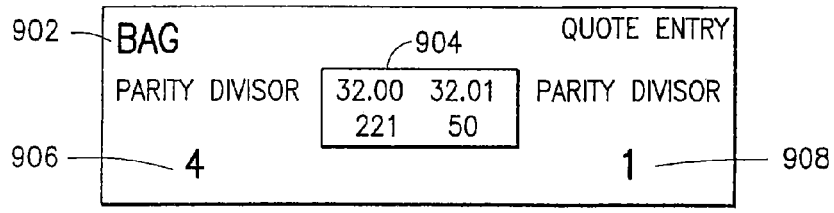

With the display book and market in the condition illustrated in FIG. 9B, the investor submits an NX limit sell order for 800 shares at 32.00. This order is submitted through CMS and SuperDot with an indicator requesting automatic execution (NX). The NX order is processed as described above with reference to FIGS. 4 and 5.

Because the order is at or better than the quote, and the bid quote size is sufficient to cover the NX sell order of 800 shares, for NX execution report processing, system 100 reports 800 shares of NX order sold to SuperDot for delivery to the entering firm via CMS. NX is appended to the execution report, and the give up is 2 LMT, 6 NX (25% of 800 shares 200 shares to the book, 75% of 800 shares=600 shares to the crowd).

For contra execution report processing, system 100 reports 200 shares bought to SuperDot via CMS, with the give up 2 LMT.

For MDS trade reporting, system 100 reports the trade with "E" indicator appended, and the report is sent to MDS (800 traded at 32.00).

For MDS quote reporting, the quote is automatically updated and published (market 32.00 bid for 21,300 shares and 5,000 shares offered at 32.01) with NX autoquote indicator for surveillance use only, which is displayed as:

32.00|32.01

213|50

The display book window is updated as illustrated in FIG. 9C. The limit side of the book (910) is reduced by 200 shares (from 4,000 to 3,800). The last sale and tick are updated, and the bid quote size is reduced by 800 shares by autoquote. Because a portion of the order was against the crowd, specialist 107 must provide real names.

Figure 9D:
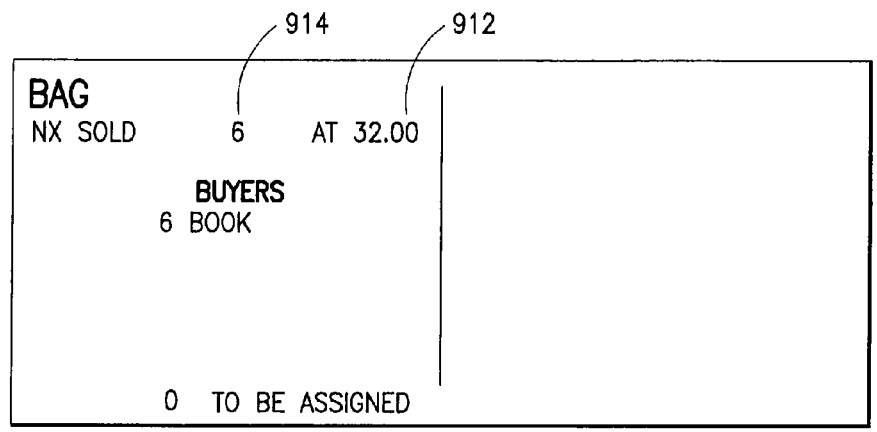
Figure 9E:
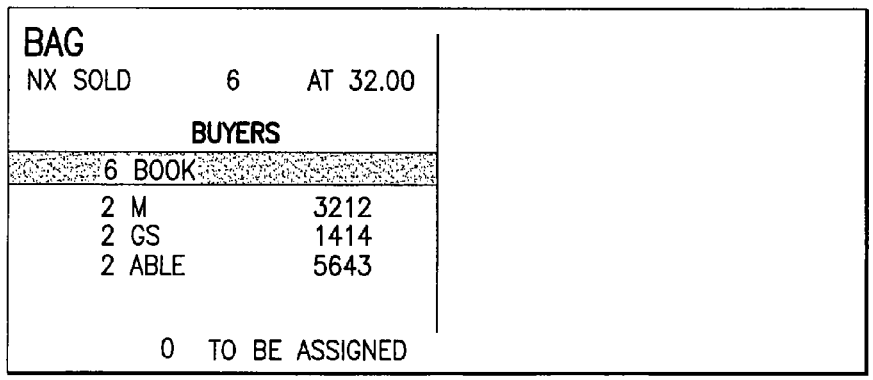

Referring to FIG. 9D, the real names template shows NX Sold, the right side is blank, and the price defaults to 32.00 (912), with NX defaults to 600 shares (914). Specialist 107 must enter contra side quantities, names, and (optional) badge numbers. Although 600 shares to book are initially displayed, as illustrated in FIG. 9E, when all 600 shares are allocated to real names, the 600 shares book goes gray and the template shows 0 remaining to be assigned. Specialist 107 presses either the smart report key, or done key.

The display book sends a real names administrative message to SuperDot, modifying the trade with the needed names.

IV. EXAMPLE 4

Referring to FIG. 10, a partial NX execution, with remainder placed on the book and quote reduction is illustrated. The published quote is all book, there is no crowd interest. The market is 31.14 bid for 200 shares and 5,000 shares offered at 32.01, which is displayed as:

| 31.14 | 32.01 |
|-------|-------|
| 2     | 50    |

The parity divisors on the bid and offer sides are both 1 (meaning all book), and the book is not frozen.

With the display book and market in the condition illustrated in FIG. 10B, the investor submits an NX limit sell order for 1,000 shares at 31.14. This order is submitted through CMS and SuperDot with an indicator requesting automatic execution (NX). The NX order is processed as described above with reference to FIGS. 4 and 5.

Although the order is at or better than the quote, the bid quote size is only 200 shares. Therefore, the remaining 800 shares of the 1,000 share order are placed as regular limit orders to sell at 31.14. For NX execution report processing, system 100 reports 200 shares of NX order sold to SuperDot for delivery to the entering firm via CMS. NX is appended to the execution report, and the give up is 2 LMT.

For contra execution report processing, system 100 reports 200 shares bought to SuperDot for delivery to the entering firm via CMS, with the give up 2 LMT.

For MDS trade reporting, system 100 reports the trade with "E" indicator appended, and the report is sent to MDS (200 traded at 31.14).

For MDS quote reporting, the quote is automatically updated and published (market 31.14 bid for 100 shares and 5,000 shares offered at 32.01) with NX autoquote indicator for surveillance use only, which is displayed as:

| 31.14 | 32.01 |
|---|---|
| 1 | 50 |

The display book window is updated as illustrated in FIG. 10C. The book at 31.14 shows the limit side of the book (1002) is reduced by 200 shares to zero (0) and the other 800 shares of the sell order added to the offer side (1004) at 31.14. The last sale and tick are updated, and the bid quote size is reduced to the minimum size of 100 shares by autoquote. This has the effect of freezing the display book on the bid side. The specialist must requote the stock.

V. EXAMPLE 5

Referring to FIG. 11, an NX execution under effective sequencing rules is illustrated. The published quote on the bid side is both book and crowd. The market is 31.11 bid for 1,000 shares and 800 shares offered at 31.14, which is displayed as:

| 31.11 | 31.14 |
|---|---|
| 10 | 8 |

The parity divisors on the bid and offer sides are both 1 (meaning all book), and the book is not frozen.

With the display book in the condition illustrated in FIG. 11B, the following limit orders are received in the time sequence shown:
- (at 10:04:38) 500 shares to buy at 31.14 (1102), the quote assist begins, with a message window saying "book paired, no quote";
- (at 10:04:39) 500 shares to buy at 31.12 (1104); and
- (at 10:04:40) 500 shares to buy at 31.13 (1106).

The display book is updated to the condition illustrated in FIG. 11C, and an investor submits an NX limit sell order for 1,000 shares at 31.08. This order is submitted through CMS and SuperDot with an indicator requesting automatic execution (NX). The NX order is processed as described above with reference to FIGS. 4 and 5.

Because the NX order is equal to or better than the published quote, and the bid quote size is sufficient to cover the NX sell order for 1,000 shares, for NX execution report processing, system 100 reports 1,000 shares of NX order sold at 31.11 to SuperDot for delivery to the entering firm via CMS. NX is appended to the execution report, and the give up is 10 LMT.

For contra execution report processing, system 100 makes the following reports:
- 200 shares (from those on the book at 31.11 (1108)) bought at 31.11 to SuperDot via CMS, with the give up 2 LMT.
- 500 shares (from those on the book at 31.14 (1102)) bought at 31.11 to SuperDot via CMS, with the give up 5 LMT.
- 300 shares (from those on the book at 31.12 (11.04)) bought at 31.11 to SuperDot via CMS, with the give up 3 LMT.

For MDS trade reporting, system 100 reports the trade with "E" indicator appended, and the report is sent to MDS (1,000 traded at 31.11).

For MDS quote reporting, the quote is automatically updated and published (market 31.11 bid for 100 shares and 800 shares offered at 31.14) with NX autoquote indicator for surveillance use only, which is displayed as:

| 31.11 | 311.4 |
|---|---|
| 1 | 8 |

The display book window is updated as illustrated in FIG. 1 ID. The bid entry at 31.11 shows the limit side of the book is reduced by 200 shares to zero and the entire line is removed. The bid side entry at 31.14 (1102) shows the limit side of the book reduced by 500 shares and the bid side entry is eliminated, leaving the other side. The bid side entry at 31.12 (1104) is reduced by 300 shares from 500 shares to 200 shares. The bid entry at 31.13 (1106) is unchanged.

The last sale and tick are updated, and the bid quote size (1110) is reduced to the minimum size of 100 shares by autoquote, suspending NX executions on the bid side.

The specialist will need to manually requote the stock, as the quote does not correctly reflect the best bid at 31.13.

VI. EXAMPLE 6

Referring to FIG. 12, an NX execution with automatic re-filing of tick sensitive orders with a partial execution is illustrated. The published quote on the bid side is all book. The market is 31.00 bid for 400 shares and 5,000 shares offered at 31.03, which is displayed as:

| 31.00 | 31.03 |
|---|---|
| 4 | 50 |

The parity divisors on the bid and offer sides are both 1 (meaning all book), and the book is not frozen.

All 5,000 shares offered at 31.03 (1202) are tick sensitive with quantity shown in the tick order field (1204). (The following orders are considered tick sensitive orders: short orders, buy minus orders and sell plus orders.)

With the display book and market in the condition illustrated in FIG. 12A, the investor submits an NX limit sell order for 500 shares at 31.00. This order is submitted through CMS and SuperDot with an indicator requesting automatic execution (NX). The NX order is processed as described above with reference to FIGS. 4 and 5.

The order price is at or better than the quote. However, because the bid size is only 400 shares, it is not sufficient to cover the entire 500 share NX order. Therefore, system 100 sells 400 shares against the book at 31.00 (the entire interest on the book at 31.00), and the remaining 100 shares (1206) of the NX order are placed on the book as a regular limit order to sell at 31.00.

For NX execution report processing, system 100 reports 400 shares of NX order sold at 31.00 to SuperDot for delivery to the entering firm via CMS. NX is appended to the execution report, and the give up is 4 LMT.

For contra execution report processing, system 100 makes the following report, 400 shares bought at 31.00 to SuperDot via CMS, with the give up 4 LMT.

For MDS trade reporting, system 100 reports the trade with "E" indicator appended, and the report is sent to MDS (400 shares traded at 31.00).

For MDS quote reporting, the bid quote is automatically updated and published (market 31.00 bid for 100 shares and 5,000 shares offered at 31.03) with NX autoquote indicator for surveillance use only, which is displayed as:

| 31.00 | 30.03 |
|---|---|
| 1 | 50 |

The display book window is updated as illustrated in FIG. 12B.

The limit portion of the book shows bids at 31.00 reduced by 400 shares, leaving the bid field blank at 31.00. 100 shares are placed on the sell side (1206) at 31.00.

The last sale and tick (1208) are updated to −31.00, and the bid quote size (1210) is reduced to the minimum size of 100 shares by autoquote, suspending NX orders on the bid side of the market.

The eligible tick sensitive sell orders (1202) are automatically re-filed at 31.01 (the lowest plus tick).

The specialist will need to manually requote the stock, as the quote does not correctly reflect the best book bid at 30.14 and the best book offer at 31.00.

VII. EXAMPLE 7

Referring to FIG. 13, an NX execution with election of CAP orders (flash window update) is illustrated. The published quote on the bid side is all book. The market is 31.00 bid for 2,500 shares and 5,000 shares offered at 31.03, which is displayed as:

| 31.00 | 31.03 |
|---|---|
| 25 | 50 |

The parity divisors on the bid and offer sides are both 1 (meaning all book), and the book is not frozen.

The last sale is at −31.02, and all 5,000 shares offered at 31.03 are tick sensitive with quantity shows in the tick order field (1301).

There are also 10,000 shares desired to buy across 2 CAP orders (1302); 5,000 shares available to sell across 1 CAP order (1304).

With the display book and market in the condition illustrated in FIG. 13A, the investor submits an NX limit sell order for 1,000 shares at 31.00. This order is submitted through CMS and SuperDot with an indicator requesting automatic execution (NX). The NX order is processed as described above with reference to FIGS. 4 and 5.

Because the order is at or better than the quote, and the bid quote size is sufficient to cover the NX sell order of 1,000 shares, System 100 sells all 1,000 shares against the book at 31.00. For NX execution report processing, system 100 reports 1,000 shares of NX order sold at 31.00 to SuperDot for delivery to the entering firm via CMS. NX is appended to the execution report, and the give up is 10 LMT.

For contra execution report processing, system 100 makes the following report, 1,000 shares bought at 31.00 to SuperDot via CMS, with the give up 10 LMT.

For MDS trade reporting, system 100 reports the trade with "E" indicator appended, and the report is sent to MDS (1,000 traded at 31.00).

For MDS quote reporting, the bid quote is automatically updated and published (market 31.00 bid for 1,500 shares and 5,000 shares offered at 31.03) with NX autoquote indicator for surveillance use only, which is displayed as:

| 31.00 | 31.03 |
|---|---|
| 15 | 50 |

The display book window is updated as illustrated in FIG. 13B.

The limit portion of the book shows bids at 31.00 (1308) reduced by 1,000 shares, leaving 1,500 shares at 31.00.

The last sale and tick (1310) are updated to −31.00, and the bid quote size is reduced by 1,500 shares by autoquote.

Tick sensitive sell orders (1312) are automatically re-filed at 31.01 (the lowest plus tick).

The specialist will need to manually requote the stock, as the quote does not correctly reflect the best offer at 31.01.

The flash window (1306) is updated as follows: 1,000 shares for each of the buyers; 1,000 shares for the seller.

VIII. EXAMPLE 8

Referring to FIG. 14, an NX execution with election of CAP orders (flash window update), implicit freeze (report template) and real names template is illustrated. The published quote on the bid side is all book. The market is 31.00 bid for 2,500 shares and 5,000 shares offered at 31.03, which is displayed as:

| 31.00 | 31.03 |
|---|---|
| 25 | 50 |

The last sale is at −31.02, and all 5,000 shares offered at 31.03 are tick sensitive with quantity showing in the tick order field (1401).

There are also 10,000 shares desired to buy across 2 CAP orders (1402); 5,000 shares available to sell across 1 CAP order (1404).

The parity divisors on the bid and offer sides are both 1 (meaning all book), and a smart report template is open, causing an implicit freeze of the book.

With the display book and market in the condition illustrated in FIG. 14A, the investor submits an NX limit sell order for 1,000 shares at 31.00. This order is submitted through CMS and SuperDot with an indicator requesting automatic execution (NX). The NX order is processed as described above with reference to FIGS. 4 and 5.

Because the order is at or better than the quote, and the bid quote size is sufficient to cover the NX sell order of 1,000 shares, system 100 sells 1,000 shares against the book at 31.00. For NX execution report processing, system 100 reports 1,000 shares of NX order sold at 31.00 to SuperDot for delivery to the entering firm via CMS. NX is appended to the execution report, and the give up is 10 NX. (Although the order was filled by LMT, in this example, the give up is NX, and not LMT because the display book is frozen.)

There is no contra execution report processing, as the trade is against NX.

For MDS trade reporting, system 100 reports the trade with "E" indicator appended, and the report is sent to MDS (1,000 traded at 31.00).

For MDS quote reporting, the bid quote is automatically updated and published (market 31.00 for 1,500 and 5,000 at 31.03) with NX autoquote indicator for surveillance use only, which is displayed as:

| 31.00 | 30.03 |
|---|---|
| 15 | 50 |

The book is frozen by the smart report template, so the limit portion is unchanged. This is illustrated in FIG. 14B, where the flash portion (1406) is updated as follows: 1,000 shares for each of the buyers, with 1,000 shares for the seller.

As soon as specialist 107 hits the clear key, clearing the smart report template, the book becomes unfrozen, and the tick sensitive orders (1408) are automatically re-filed at 31.01 (lowest plus tick). This is illustrated in FIG. 14C.

When specialist 107 hits the smart report key, the real names template appears, as illustrated in FIG. 14D. The left side of the template shows NX Sold, and the price defaults to 31.00, with 1,000 shares of book shown.

Specialist 107 initiates report processing by pressing one of the following: smart report key or done key. The limit portion of the book is reduced by 1,000 shares at 31.00, leaving 1,500 shares at 31.00. The display book sends out a real names administrative message to SuperDot, modifying the original trade with needed names.

For contra execution reporting, system 100 reports 1,000 shares bought at 31.00 to SuperDot for delivery to the entering firm via CMS, with a give up of 10 LMT.

IX. EXAMPLE 9

Referring to FIG. 15, an NX execution with automatic re-filing of tick sensitive orders, and NX order executed at offer price before quote change is illustrated. The published quote on the bid side is all book. The market is 31.00 bid for 2,500 shares and 5,000 shares offered at 31.03, which is displayed as:

| 31.00 | 31.03 |
|---|---|
| 25 | 50 |

The last sale is at –31.02, and 3,000 of the 5,000 shares offered at 31.03 are tick sensitive with quantity shown in the tick order field (1502).

The limit sell orders at 31.03 arrived in the following sequence:
(1) 500 short, market, @10:01:02;
(2) 1,000 limit, GTC, @10:01:06;
(3) 1,500 short, market, @10:01:11;
(4) 1,000 short, market, @10:01:22; and
(5) 1,000 limit, DAY, 10:01:34.

The parity divisors on the bid and offer sides are both 1 (meaning all book), and the book is not frozen.

With the display book and market in the condition illustrated in FIG. 15A, the first investor submits an NX limit sell order for 1,000 shares at 31.00. This order is submitted through CMS and SuperDot with an indicator requesting automatic execution (NX). The NX order is processed as described above with reference to FIGS. 4 and 5.

Because the order is at or better than the quote, and the bid quote size is sufficient to cover the NX sell order of 1,000 shares, system 100 sells 1,000 shares against the book at 31.00.

For NX execution report processing, system 100 reports 1,000 shares of NX order sold at 31.00 to SuperDot for delivery to the entering firm via CMS. NX is appended to the execution report, and the give up is 10 LMT.

For contra execution report processing, system 100 reports 1,000 shares bought at 31.00 to SuperDot for delivery to the entering firms via CMS. The give up is 10 LMT.

For MDS trade reporting, system 100 reports the trade with "E" indicator appended, and the report is sent to MDS (1,000 traded at 31.00).

For MDS quote reporting, the bid quote is automatically updated and published (31.00 bid for 1,500 shares and 5,000 shares offered at 31.03) with NX autoquote indicator for surveillance use only, which is displayed as:

| 31.00 | 31.03 |
|---|---|
| 15 | 50 |

The display book is updated, as illustrated in FIG. 15B. The last sale and tick (1504) are updated to –31.00.

The bid quote size (1506) is reduced to 1,500 shares from 2,500 shares by autoquote.

The limit portion of the bid side of the book (1508) is reduced by 1,000 shares at 31.00, leaving 1,500 shares at 31.00.

The 3,000 shares of tick sensitive orders (1510) are automatically re-filed at 31.01 (lowest plus tick) (short orders (1), (3) and (4) originally filed at 31.03 are now at 31.01, while limit orders (2) and (5) are still at 31.03).

The parity divisor on the offer side is temporarily zero because short orders are filed at a better price than the quote offer.

There is no real names indicator for this trade.

With the book in the condition illustrated in FIG. 15B, (with the parity divisor on the offer side temporarily zero), a second investor submits an NX limit buy order for 1,000 shares at 31.03. This order is submitted through CMS and SuperDot with an indicator requesting automatic execution (NX). The NX order is processed as described above with reference to FIGS. 4 and 5.

Because the order is at or better than the quote, and the offer quote size is sufficient to cover the NX buy order of 1,000 shares, system 100 buys 1,000 shares against the book at 31.03. For NX execution report processing, system 100 reports 1,000 shares of NX order bought at 31.03 to SuperDot for delivery to the entering firm via CMS. NX is appended to the execution report, and the give up is 10 NX. (In this example, the give up is NX, not LMT because the parity divisor on the offer side is temporarily zero.)

There is no contra execution report, as the trade is against NX.

For MDS trade reporting, system 100 reports the trade with "E" indicator appended, and the report is sent to MDS (1,000 traded at 31.03).

For MDS quote reporting, the quote is automatically updated and published (market 31.00 bid for 1,500 shares and 4,000 shares offered at 31.03) with NX autoquote indicator for surveillance use only, which is displayed as:

| 31.00 | 31.03 |
|---|---|
| 15 | 40 |

The display book is updated, as illustrated in FIG. 15C. The last sale and tick (1512) are updated to +31.03.

The 3,000 shares of tick sensitive orders (1510) are automatically re-filed at 31.03, as of the previous filed date and time, and the quote assist timer stops because the ticks were unfilled at 31.01.

The offer quote size is reduced to 4,000 from 5,000 by autoquote.

The quote assist timer starts for the filed tick orders at 31.03.

The real names template is completed, giving 1,000 shares to the book. The display book sends out a real names administrative message to SuperDot, modifying the original trade with needed names.

A contra execution report is processed.

Since execution of the NX buy order (trade number 2) was in time sequence against sell order 500 shares of tick sensitive order (1), and 500 shares of sell order (2), the limit portion of the book is updated at 31.03 to show re-filing of the 2,500 remaining tick sensitive orders (3) (1,500 shares of tick sensitive orders) and (4) (1,000 shares of tick sensitive orders).

X. EXAMPLE 10

Referring to FIG. 16, an NX execution with election of stops with real names template is illustrated. The published quote is all book. The last sale is at −31.02 and there are 2,000 sell stop orders (1602) at 31.00. The market is 31.00 bid for 2,500 shares and 5,000 shares offered at 31.03, which is displayed as:

| 31.00 | 31.03 |
|---|---|
| 25 | 50 |

The parity divisors on the bid and offer sides are both 1. There is a smart report template open, implicitly freezing the book.

There are three trades in this example. The first trade is an NX limit order to sell 1,000 shares, the second trade is a DOT market order to sell 300 shares, and the third trade is a DOT market order to sell 700 shares.

With the display book and market in the condition illustrated in FIG. 16A, the investor submits an NX limit sell order for 1,000 shares at 31.00 (this is trade number 1). This order is submitted through CMS and SuperDot with an indicator requesting automatic execution (NX). The NX order is processed as described above with reference to FIGS. 4 and 5.

Because the order is at or better than the quote, and the bid quote size is sufficient to cover the NX sell order of 1,000 shares, for NX execution report processing, system 100 reports 1,000 shares of NX order sold at 31.00 to SuperDot for delivery to the entering firm via CMS. NX is appended to the execution report, and the give up is 10 NX.

There is no contra execution report processing, as the trade is against NX.

For MDS trade reporting, system 100 reports the trade with "E" indicator appended, and the report is sent to MDS (1,000 traded at 31.00).

For MDS quote reporting, the quote is automatically updated and published (market 31.00 bid for 1,500 shares and 5,000 shares offered at 31.03) with NX autoquote indicator for surveillance use only, which is displayed as:

| 31.00 | 31.03 |
|---|---|
| 15 | 50 |

The display book window is updated as illustrated in FIG. 16B.

As illustrated in FIG. 16C, since the last sale is at 31.00, that is noted as the NX reference price in the real names template.

Before the real names template is completed, SuperDot sends a DOT order to the display book (which is frozen) to sell 300 shares (this is trade number 2), and then SuperDot sends a DOT order to the display book (which is still frozen) to sell 700 shares (this is trade number 3).

These DOT orders are received by the display book and held in queue. However, the limit portion of the book is unchanged, as illustrated in FIG. 16B.

When specialist 107 presses the clear key, as illustrated in FIG. 16D, the 2,000 sell stop orders are elected on the election reference price and appear in the thermometer (1604). The DOT order to sell 300 (trade number 2) appears in the thermometer, and the DOT order to sell 700 (trade number 3) appears in the thermometer.

As illustrated in FIG. 16C, the real names template is completed, giving 1,000 shares to the book. Then, system 100 sends out real names administrative message to SuperDot modifying the original trade with needed names.

The display book is updated as illustrated in FIG. 16D, and a contra report is processed.

XI. EXAMPLE 11

Referring to FIG. 17, a partial NX execution under explicit freeze with other DOT orders is illustrated. The published quote is all book. The market is 31.00 bid for 500 shares and 5,000 shares offered at 31.03, which is displayed as:

| 31.00 | 31.03 |
|---|---|
| 5 | 50 |

The parity divisors on the bid and offer sides are both 1 (meaning last sale is −31.02 all book), and the freeze key is depressed, explicitly freezing the display book.

With the book in the condition illustrated in FIG. 17A, an investor submits a regular limit sell order for 300 shares at 31.00. Since an explicit freeze is in place on the display book, this order is placed in queue.

Next, another investor submits an NX limit order to sell 1,000 shares at 31.00. This second order is submitted through CMS and SuperDot with an indicator requesting automatic execution (NX). The NX order is processed as described above with reference to FIGS. 4 and 5.

Because the order is at or better than the quote, and the bid quote size is sufficient to cover the NX sell order of 1,000 shares, and although the display book is frozen, for NX order processing, system 100 processes 500 shares of the NX order, which is the size of the bid at 31.00, with the other 500 shares from the NX order changed to a regular limit order and remaining in queue.

Next, an investor submits a regular limit order to sell 600 shares at 31.00. Since an explicit freeze is in place on the display book, this order is placed in queue.

For NX order execution reporting, system 100 reports 500 shares (of the original 1,000 NX order) sold at 31.00 to SuperDot for delivery to the entering firm via CMS. NX is appended to the execution report, and the give up is 5 NX.

For MDS trade reporting, system 100 reports the trade with "E" indicator appended, and the report is sent to MDS (500 traded at 31.00).

Because all of the 500 shares were from the book, there is no more size on the bid side of the book at 31.00, and real names are required. For MDS quote reporting, the quote is automatically updated and published (market 31.00 bid for 100 shares and 5,000 shares offered at 31.03) with NX autoquote indicator for surveillance use only, which is displayed as:

| 31.00 | 31.03 |
|---|---|
| 1 | 50 |

The display book window is updated as illustrated in FIG. 17B, although the sell limit side (1702) is unchanged, because the book is frozen.

The last sale and tick are updated to −31.00, with the bid quote size reduced to the minimum size of 100 shares by autoquote, which continues the freeze of the book.

When the specialist presses the freeze key (toggles freeze off), the new limit orders appear in correct time sequence, which is 300 shares to sell at 31.00; 500 shares to sell at 31.00 (from the NX order); and 600 shares to sell at 31.00.

The real names template (not illustrated) is completed (e.g., report 500 shares at 31.00, give up is 5 LMT), and the display book sends out real names to SuperDot modifying the original trade with needed names.

A contra execution report is processed, and the book appears as illustrated in FIG. 17C.

XII. EXAMPLE 12

Referring to FIG. 18, an erroneous quote input by the clerk is illustrated. The best bid on the book is 31.00 for 500 shares and 5,000 shares offered at 31.03. However, the clerk has mistakenly set the quote at 21.00 bid for 500 shares and 5,000 shares offered at 21.03, which is displayed as:

| 21.00 | 21.03 |
|---|---|
| 5 | 50 |

The parity divisors on the bid and offer sides are both 1 (meaning all book), and the book is not frozen.

With the display book and market in the condition illustrated in FIG. 18A, an investor submits an NX sell order for 500 shares at 21.00. This order is submitted through CMS and SuperDot with an indicator requesting automatic execution (NX). The NX order is processed as described above with reference to FIGS. 4 and 5.

Since this order is more than 2 points from the last sale, NX processing is suspended for this stock, and the order is placed on the book.

As illustrated in FIG. 18D, a normal highlighting scheme occurs, with the book showing cyan from the book bid at 31.00 to the new offer at 21.00.

XIII. EXAMPLE 13

Referring to FIG. 19, an NX execution on two sides is illustrated. The published quote on the bid side is book and crowd. The market is 31.00 bid for 1,000 shares and 5,000 shares offered at 31.03, which is displayed as:

| 31.00 | 31.03 |
|---|---|
| 10 | 50 |

The parity divisors on the bid and offer sides are both 1 (meaning all book), and the book is not frozen. The last sale is at −31.02.

With the display book and market in the condition illustrated in FIG. 19A, two NX trades are received.

The first investor submits an NX limit order to sell 1,000 shares at 31.00. This order is submitted through CMS and SuperDot with an indicator requesting automatic execution (NX). The NX order is processed as described above with reference to FIGS. 4 and 5.

Because the order is at or better than the quote, and the bid quote size is sufficient to cover the NX sell order of 1,000 shares, system 100 sells 1,000 shares against the book at 31.00. For NX execution report processing, system 100 reports 1,000 shares of NX order sold at 31.00 to SuperDot for delivery to the entering firm via CMS. NX is appended to the execution report, and the give up is 5 LMT, 5 NX (names pending). Whenever there is insufficient stock on the book, the remaining balance is real names, even though the parity divisor is one.

For contra execution report processing, system 100 reports 500 shares bought at 31.00 to SuperDot for delivery to the entering firm via CMS, with the give up 5 LMT.

For MDS trade reporting, system 100 reports the trade with "E" indicator appended, and the report is sent to MDS (1,000 traded at 31.00).

For MDS quote reporting, the quote is automatically updated and published (market 31.00 bid for 100 shares and 5,000 shares offered at 31.03) with NX autoquote indicator for surveillance use only, which is displayed as:

| 31.00 | 31.03 |
|---|---|
| 1 | 50 |

The display book window is updated as illustrated in FIG. 19B.

The last sale and tick are updated to −31.00, and the bid quote size is automatically reduced to the minimum size of 100 shares by autoquote, and therefore NX is suspended on the bid side of the market.

1,000 stop orders are elected into market orders and are received in the thermometer (1903). Short sales of 3,000 shares at 31.03 are re-filed at 31.01 (1902) (lowest plus tick above last sale) and get a yellow highlight. The limit portion of the book removes the line at 31.00, however the re-filed ticks at 31.01 are not reflected in the published quote as illustrated.

As illustrated in FIG. 19C, the real names template is brought up, and the book implicitly frozen.

For trade 2, an investor submits an NX limit buy order for 1,000 shares at 31.03. This order is submitted through CMS and SuperDot with an indicator requesting automatic execution (NX). The NX order is processed as described above with reference to FIGS. 4 and 5.

Although NX processing is suspended on the bid side because the bid size is 100 shares and the book is frozen, because the NX order is at or better than the quote, and the offer quote size is sufficient to cover the NX buy order for 1,000 shares, 1,000 shares are bought against the book at 31.03. For NX execution report processing, system 100 reports 1,000 shares of NX order bought at 31.03 to SuperDot for delivery to the entering firm via CMS. NX is appended to the execution report, and the give up is 10 NX.

There is no contra execution report, as the trade is against NX.

For MDS trade reporting, system 100 reports the trade with "E" indicator appended, and the report is sent to MDS (1,000 traded at 31.03).

The offer side of the quote is automatically updated to 4,000 shares, which is illustrated as:

| 31.00 | 31.03 |
|---|---|
| 1 | 40 |

As illustrated in FIG. 19D, the last sale and tick is updated to +31.03. The offer quote size is automatically reduced to 4,000 (at 31.03) by autoquote.

2,000 buy stop orders (1904) are elected into market orders, and are placed in queue. By chance, a DOT market order to buy 500 shares (1906) is received and placed in queue.

Another DOT market order to buy 800 shares (1908) is received and placed in queue.

The real names template for the first trade (see FIG. 19C) is now completed (500 shares Merrill, badge 1234.), and the freeze on the book is lifted. However, real names are still required for trade number 2 (NX limit buy order for 1,000 shares at 31.03).

3,000 shares in short sales are re-filed at 31.03 as of previous filed date and time.

The 2,000 elected buy stop orders, the 500 DOT market order and the 800 DOT market order all enter the thermometer.

As illustrated in FIG. 19E, the real names template comes up for trade 2, and the book is implicitly frozen. The template is completed with 1,000 shares to Book.

A contra execution report is processed for trade 2, and the display book sends a real names administrative message to SuperDot modifying the original trade with needed names.

The specialist 107 manually updates to quote the book, as illustrated in FIG. 19F.

Although illustrative embodiments have been described herein in detail, it should be noted and will be appreciated by those skilled in the art that numerous variations may be made within the scope of this invention without departing from the principle of this invention and without sacrificing its chief advantages.

In one such embodiment, the order or securities transaction is submitted directly by member firm 101 trading on their own account.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method implemented at least partially in a programmed computer for processing a round-lot securities order on a single securities exchange, the method comprising:
    a) receiving by the programmed computer, an execution allocation option for a security, wherein the execution allocation option is one of three options selected from the group consisting of allocate execution to crowd only, allocate execution to book only, or allocate a percentage of execution to crowd and allocate a percentage of execution to book;
    b) receiving by the programmed computer, the round-lot securities order for the security, after receiving the execution allocation option;
    c) determining by the programmed computer, whether the securities order includes an indicator requesting automatic execution, wherein the indicator requesting automatic execution directs the single securities exchange to execute the securities order at either a best bid to buy or best offer to sell as reflected in a quote price for the security that is published by the single securities exchange and also acknowledges that the securities order will not be exposed to an auction market crowd of the single securities exchange for possible price improvement;
    d) if the securities order does not include the indicator requesting automatic execution, exposing the securities order to the auction market crowd of the single securities exchange for possible price improvement;
    e) if the securities order includes the indicator requesting automatic execution, automatically executing by the programmed computer, the securities order at the best bid to buy or best offer to sell as reflected in the published quote price for the security, without exposing the securities order for possible price improvement; and
    f) after automatically executing the securities order, allocating by the programmed computer, shares of the automatic execution among contra parties according to the previously received execution allocation option.

2. A method according to claim 1, wherein the securities order is a limit order.

3. A method according to claim 1, wherein the securities order is a market order.

4. A method according to claim 1, further comprising sending an order execution report.

5. A method according to claim 1, wherein automatically executing further comprises at least partially fulfilling the securities order from a display book order.

6. A method according to claim 1, further comprising at least partially fulfilling the securities order from an auction market crowd order after automatically executing the securities order.

7. A method according to claim 1, further comprising at least partially fulfilling the securities order from a display book order after automatically executing the securities order.

8. A computer-readable medium having computer executable software code stored thereon, the code for processing a round-lot securities order on a single securities exchange, the code comprising:
    a) code to assign an execution allocation option to a security, wherein the execution allocation option is one of three options selected from the group consisting of allocate execution to crowd only, allocate execution to book only, or allocate a percentage of execution to crowd and allocate a percentage of execution to book;
    b) code to receive the round-lot securities order for the security, after assigning the execution allocation option;
    c) code to determine whether the securities order includes an indicator requesting automatic execution, wherein the indicator requesting automatic execution directs the single securities exchange to execute the securities order at either a best bid to buy or best offer to sell as reflected in a quote price for the security that is published by the single securities exchange and also acknowledges that the securities order will not be exposed to an auction market crowd of the single securities exchange for possible price improvement;

d) if the securities order does not include the indicator requesting automatic execution, code to expose the securities order to the auction market crowd of the single securities exchange for possible price improvement;

e) if the securities order includes the indicator requesting automatic execution, code to automatically execute the securities order at the best bid to buy or best offer to sell as reflected in the published quote price for the security, without exposing the securities order for possible price improvement; and f) after automatically executing the securities order, code to allocate shares of the automatic execution among contra parties according to the previously assigned execution allocation option.

9. A programmed computer for processing a round-lot securities order on a single securities exchange, comprising:
a memory having at least one region for storing computer executable program code; and
a processor for executing the program code stored in the memory; wherein the program code comprising:

a) code to assign an execution allocation option to a security, wherein the execution allocation option is one of three options selected from the group consisting of allocate execution to crowd only, allocate execution to book only, or allocate a percentage of execution to crowd and allocate a percentage of execution to book;

b) code to receive the round-lot securities order for the security, after assigning the execution allocation option;

c) code to determine whether the securities order includes an indicator requesting automatic execution, wherein the indicator requesting automatic execution directs the single securities exchange to execute the securities order at either a best bid to buy or best offer to sell as reflected in a quote price for the security that is published by the single securities exchange and also acknowledges that the securities order will not be exposed to an auction market crowd of the single securities exchange for possible price improvement;

d) if the securities order does not include the indicator requesting automatic execution, code to expose the securities order to the auction market crowd of the single securities exchange for possible price improvement;

e) if the securities order includes the indicator requesting automatic execution, code to automatically execute the securities order at the best bid to buy or best offer to sell as reflected in the published quote price for the security, without exposing the securities order for possible price improvement; and f) after automatically executing the securities order, code to allocate shares of the automatic execution among contra parties according to the previously assigned execution allocation option.

10. A method implemented at least partially in a programmed computer for processing a round-lot limit buy or sell order for a security on a single securities exchange with an auction market crowd, the method comprising:

a) receiving by the programmed computer, an execution allocation option for the security, wherein the execution allocation option is one of three options selected from the group consisting of allocate execution to crowd only, allocate execution to book only, or allocate a percentage of execution to crowd and allocate a percentage of execution to book;

b) receiving by the programmed computer, the round-lot limit order for the security, after receiving the execution allocation option;

c) determining by the programmed computer, whether the limit order includes an indicator requesting automatic execution, wherein the indicator requesting automatic execution directs the single securities exchange to execute the limit order at either a best offer to sell or best bid to buy as reflected in a quote price for the security that is published by the single securities exchange and also acknowledges that the limit order will not be exposed to an auction market crowd of the single securities exchange for possible price improvement;

d) determining by the programmed computer, whether the limit order qualifies for automatic execution;

e) if the limit order does not include the indicator requesting automatic execution, or if the limit order does not qualify for automatic execution, exposing the limit order to the auction market crowd for possible price improvement;

f) if the limit order includes the indicator requesting automatic execution and the limit order qualifies for automatic execution, automatically executing by the programmed computer, the limit order against the respective best offer to sell or best bid to buy for the security, without exposing the limit order to the auction market crowd for possible price improvement; and g) after automatically executing the limit order, allocating by the programmed computer, shares of the automatic execution among contra parties according to the previously received execution allocation option.

11. A method implemented at least partially in a programmed computer for processing a round-lot market buy or sell order for a security on a single securities exchange with an auction market crowd, the method comprising:

a) receiving by the programmed computer, an execution allocation option for the security, wherein the execution allocation option is one of three options selected from the group consisting of allocate execution to crowd only, allocate execution to book only, or allocate a percentage of execution to crowd and allocate a percentage of execution to book;

b) receiving by the programmed computer, the round-lot market order for the security, after receiving the execution allocation option;

c) determining by the programmed computer, whether the market order includes an indicator requesting automatic execution, wherein the indicator requesting automatic execution directs the single securities exchange to execute the market order at either a best offer to sell or best bid to buy as reflected in a quote price for the security that is published by the single securities exchange and also acknowledges that the market order will not be exposed to an auction market crowd of the single securities exchange for possible price improvement;

d) determining by the programmed computer, whether the market order qualifies for automatic execution;

e) if the market order does not include the indicator requesting automatic execution, or if the market order does not qualify for automatic execution, exposing the market order to the auction market crowd for possible price improvement;

f) if the market order includes the indicator requesting automatic execution and the market order qualifies for automatic execution, automatically executing by the programmed computer, the market order against the respective best offer to sell or best bid to buy for the security, without exposing the market order to the auction market crowd for possible price improvement; and g) after automatically executing at least a portion of the market order, allocating by the programmed computer, shares of the automatic execution among contra parties according to the previously received execution allocation option.

12. A method implemented at least partially in a programmed computer for processing a round-lot securities order on a single securities exchange, the method comprising:
   a) receiving by the programmed computer, an execution allocation option for a security, wherein the execution allocation option is one of three options selected from the group consisting of allocate execution to crowd only, allocate execution to book only, or allocate a percentage of execution to crowd and allocate a percentage of execution to book;
   b) receiving by the programmed computer, the round-lot securities order for the security, after receiving the execution allocation option;
   c) determining by the programmed computer, whether the securities order includes an indicator requesting automatic execution and a price of the securities order, wherein the indicator requesting automatic execution directs the single securities exchange to execute the securities order at either a best bid to buy or best offer to sell as reflected in a quote price for the security that is published by the single securities exchange and also acknowledges that the securities order will not be exposed to an auction market crowd of the single securities exchange for possible price improvement;
   d) if the securities order does not include the indicator requesting automatic execution, exposing the securities order to the auction market crowd of the single securities exchange for possible price improvement, wherein exposing the securities order to the auction market crowd of the single securities exchange for possible price improvement is a regular execution;
   e) if the securities order includes the indicator requesting automatic execution, comparing by the programmed computer, the price of the securities order to the published quote price for the security;
   f) if the securities order includes the indicator requesting automatic execution and the price of the securities order is not equal to or better than the published quote price for the security, changing by the programmed computer, the status of the securities order from automatic execution to regular execution;
   g) if the securities order includes the indicator requesting automatic execution and the price of the securities order is equal to or better than the published quote price for the security, automatically executing by the programmed computer, the securities order at the best bid to buy or best offer to sell the security; and
   h) after automatically executing the securities order, allocating by the programmed computer, shares of the automatic execution among contra parties according to the previously received execution allocation option.

13. A method according to claim 12, wherein the securities order further includes a size, the method further comprising:
   comparing the size of the securities order with a respective interest in the security; and
   changing the status of at least a portion of the securities order from automatic execution to regular execution if the size is greater than the interest.

14. A method according to claim 12, further comprising sending an execution report for the securities order.

15. A method according to claim 12, wherein the book is a display book, the method further comprising at least partially fulfilling the securities order with an order on the display book.

16. A method according to claim 12, further comprising at least partially fulfilling the securities order with an order from the auction market crowd.

17. A method according to claim 12, wherein the published quote price for the security includes a best bid price for the security, the securities order is a sell order and the price of the securities order is greater than the best bid price.

18. A method according to claim 12, wherein the published quote price for the security includes a best offer price for the security, the securities order is a buy order and the price of the securities order is less than the best offer price.

19. A computer-readable medium having computer executable software code stored thereon, the code for processing a round-lot securities order on a single securities exchange, the code comprising:
   a) code to assign an execution allocation option to a security, wherein the execution allocation option is one of three options selected from the group consisting of allocate execution to crowd only, allocate execution to book only, or allocate a percentage of execution to crowd and allocate a percentage of execution to book;
   b) code to receive the round-lot securities order for the security, after assigning the execution allocation option;
   c) code to determine whether the securities order includes an indicator requesting automatic execution and a price of the securities order, wherein the indicator requesting automatic execution directs the single securities exchange to execute the securities order at either a best bid to buy or best offer to sell as reflected in a quote price for the security that is published by the single securities exchange and also acknowledges that the securities order will not be exposed to an auction market crowd of the single securities exchange for possible price improvement;
   d) if the securities order does not include the indicator requesting automatic execution, code to expose the securities order to the auction market crowd of the single securities exchange for possible price improvement, wherein exposing the securities order to the auction market crowd of the single securities exchange for possible price improvement is a regular execution;
   e) if the securities order includes the indicator requesting automatic execution, code to compare the price of the securities order to the published quote price for the security;
   f) if the securities order includes the indicator requesting automatic execution and the price of the securities order is not equal to or better than the published quote price for the security, code to change the status of the securities order from automatic execution to regular execution;
   g) if the securities order includes the indicator requesting automatic execution and the price of the securities order is equal to or better than the published quote price for the security, code to automatically execute the securities order at the best bid to buy or best offer to sell the security; and
   h) after automatically executing the securities order, code to allocate shares of the automatic execution among contra parties according to the previously received execution allocation option.

20. A programmed computer for processing a round-lot securities order on a single securities exchange, comprising:
- a memory having at least one region for storing computer executable program code; and
- a processor for executing the program code stored in the memory; wherein the program code comprises:
  a) code to assign an execution allocation option to a security, wherein the execution allocation option is one of three options selected from the group consisting of allocate execution to crowd only, allocate execution to book only, or allocate a percentage of execution to crowd and allocate a percentage of execution to book;
  b) code to receive the round-lot securities order for the security, after assigning the execution allocation option;
  c) code to determine whether the securities order includes an indicator requesting automatic execution and a price of the securities order, wherein the indicator requesting automatic execution directs the single securities exchange to execute the securities order at either a best bid to buy or best offer to sell as reflected in a quote price for the security that is published by the single securities exchange and also acknowledges that the securities order will not be exposed to an auction market crowd of the single securities exchange for possible price improvement;
  d) if the securities order does not include the indicator requesting automatic execution, code to expose the securities order to the auction market crowd of the single securities exchange for possible price improvement, wherein exposing the securities order to the auction market crowd of the single securities exchange for possible price improvement is a regular execution;
  e) if the securities order includes the indicator requesting automatic execution, code to compare the price of the securities order to the published quote price for the security;
  f) if the securities order includes the indicator requesting automatic execution and the price of the securities order is not equal to or better than the published quote price for the security, code to change the status of the securities order from automatic execution to regular execution;
  g) if the securities order includes the indicator requesting automatic execution and the price of the securities order is equal to or better than the published quote price for the security, code to automatically execute the securities order at the best bid to buy or best offer to sell the security; and
  h) after automatically executing the securities order, code to allocate shares of the automatic execution among contra parties according to the previously assigned execution allocation option.

21. A method implemented at least partially in a programmed computer for processing a round-lot securities order on a single securities exchange, the method comprising:
  a) receiving by the programmed computer, an execution allocation option for a security, wherein the execution allocation option is one of three options selected from the group consisting of allocate execution to crowd only, allocate execution to book only, or allocate a percentage of execution to crowd and allocate a percentage of execution to book;
  b) receiving by the programmed computer, the round-lot securities order for the security, after receiving the execution allocation option;
  c) determining by the programmed computer, whether the securities order includes an indicator requesting automatic execution and a size of the securities order, wherein the indicator requesting automatic execution directs the single securities exchange to execute the securities order at either a best bid to buy or best offer to sell as reflected in a quote price for the security that is published by the single securities exchange and also acknowledges that the securities order will not be exposed to an auction market crowd of the single securities exchange for possible price improvement;
  d) if the securities order does not include the indicator requesting automatic execution, exposing the securities order to the auction market crowd of the single securities exchange for possible price improvement, wherein exposing the securities order to the auction market crowd of the single securities exchange for possible price improvement is a regular execution;
  e) if the securities order includes the indicator requesting automatic execution, comparing by the programmed computer, the size of the securities order to a respective interest in the security, wherein interest in the security is a number of shares of the security at a best offer to sell or best bid to buy price that is published by the single securities exchange;
  f) if the securities order includes the indicator requesting automatic execution and the size of the securities order is greater than the interest, changing by the programmed computer, the status of at least a portion of the securities order from automatic execution to regular execution;
  g) if the securities order includes the indicator requesting automatic execution and the size of the securities order is less than or equal to the interest, automatically executing by the programmed computer, the securities order at the best bid to buy or best offer to sell the security; and
  h) after automatically executing the securities order, allocating by the programmed computer, shares of the automatic execution among contra parties according to the previously received execution allocation option.

22. A method according to claim 21, wherein the securities order further includes a price, the method further comprising:
  comparing the price of the securities order to a published quote for the security; and
  changing the status of the securities order from automatic execution to regular execution if the price of the securities order is not equal to or better than the published quote for the security.

23. A method according to claim 21, wherein the securities order is a limit order.

24. A method according to claim 21, wherein the securities order is a market order.

25. A method implemented at least partially in a programmed computer for processing a round-lot securities order on a single securities exchange with an auction market crowd, the method comprising:
  a) receiving by the programmed computer, an execution allocation option for a security, wherein the execution allocation option is one of three options selected from the group consisting of allocate execution to crowd only, allocate execution to book only, or allocate a percentage of execution to crowd and allocate a percentage of execution to book;
  b) receiving by the programmed computer, the round-lot securities order for the security, after receiving the execution allocation option;
  c) determining by the programmed computer, whether the securities order is identified for automatic execution, wherein automatic execution directs the single securities exchange to execute the securities order at either a best bid to buy or best offer to sell as reflected in a quote price for the security that is published by the single securities exchange and also acknowledges that the securities order will not be exposed to an auction market crowd of the single securities exchange for possible price improvement;

d) if the securities order is not identified for automatic execution, exposing the securities order to the auction market crowd of the single securities exchange for possible price improvement;

e) if the securities order is identified for automatic execution, automatically executing by the programmed computer, the securities order against the best bid to buy or best offer to sell the security as reflected in the published quote price for the security;

f) if the securities order was automatically executed against the published quote for the security, updating by the programmed computer, the published quote for the security based on the execution of the securities order; and g) after automatically executing the securities order, allocating by the programmed computer, shares of the automatic execution among contra parties according to the previously received execution allocation option.

26. A method according to claim 25, wherein a size of the published quote for the security after updating reflects execution size of the securities order.

27. A method according to claim 25, wherein a size of the published quote for the security after updating represents a minimum quote size, but does not necessarily reflect execution size of the securities order.

28. The method according to claim 1, wherein automatically executing the securities order further comprises:

executing at least a portion of the securities order up to a size of the best bid to buy or best offer to sell as reflected in the published quote for the security.

29. The method according to claim 1, wherein automatically executing the securities order further comprises:

executing all of the securities order.

* * * * *